United States Patent
Khorshid

(10) Patent No.: US 12,353,897 B2
(45) Date of Patent: Jul. 8, 2025

(54) DYNAMICALLY MORPHING VIRTUAL ASSISTANT AVATARS FOR ASSISTANT SYSTEMS

(71) Applicant: Meta Platforms, Inc., Menlo Park, CA (US)

(72) Inventor: Mokhtar Mohamed Khorshid, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/877,568

(22) Filed: Jul. 29, 2022

(65) Prior Publication Data

US 2024/0045704 A1    Feb. 8, 2024

(51) Int. Cl.
G06F 9/451    (2018.01)
G06F 3/01    (2006.01)
G06T 19/00    (2011.01)

(52) U.S. Cl.
CPC .............. *G06F 9/453* (2018.02); *G06F 3/012* (2013.01); *G06T 19/006* (2013.01)

(58) Field of Classification Search
CPC .......... G06F 9/453; G06F 3/012; G06F 3/011; G06F 3/013; G06T 19/006; G06T 19/00; G06T 2210/44; G06T 13/40
See application file for complete search history.

(56) References Cited

U.S. PATENT DOCUMENTS

| | | |
|---|---|---|
| 5,926,537 A | 7/1999 | Birze |
| 6,014,439 A | 1/2000 | Walker et al. |
| 7,124,123 B1 | 10/2006 | Roskind et al. |
| 7,158,678 B2 | 1/2007 | Nagel et al. |
| 7,397,912 B2 | 7/2008 | Aasman et al. |
| 7,613,287 B1 | 11/2009 | Stifelman et al. |
| 7,889,853 B2 | 2/2011 | Sutcliffe |
| 8,027,451 B2 | 9/2011 | Arendsen et al. |
| 8,204,200 B2 | 6/2012 | Wang et al. |

(Continued)

FOREIGN PATENT DOCUMENTS

WO    2012116241 A2    8/2012

OTHER PUBLICATIONS

US 11,388,247 B1, 07/2022, Khemka et al. (withdrawn)

(Continued)

*Primary Examiner* — Rami R Okasha
(74) *Attorney, Agent, or Firm* — Morgan, Lewis & Bockius LLP

(57) ABSTRACT

In one embodiment, a method includes rendering for displays of an extended-reality (XR) display device a first output image of an XR assistant avatar within an environment in a field of view of a first user of the XR display device, wherein the XR assistant avatar has a first form and a first pose with respect to the first user and is interactable by the first user to access an assistant system, detecting a change in a context of the first user with respect to the environment, determining whether to morph the XR assistant avatar based on the detected change in the context of the first user, and rendering a second output image of the XR assistant avatar for the displays of the XR display device, wherein the XR assistant avatar is morphed to have a second form and a second pose with respect to the first user.

20 Claims, 20 Drawing Sheets

(56) References Cited

U.S. PATENT DOCUMENTS

| | | |
|---|---|---|
| 8,560,564 B1 | 10/2013 | Hoelzle et al. |
| 8,660,247 B1 | 2/2014 | Brown |
| 8,677,377 B2 | 3/2014 | Cheyer et al. |
| 8,935,192 B1 | 1/2015 | Ventilla et al. |
| 8,983,383 B1 | 3/2015 | Haskin |
| 9,154,739 B1 | 10/2015 | Nicolaou et al. |
| 9,251,471 B2 | 2/2016 | Pinckney et al. |
| 9,299,059 B1 | 3/2016 | Marra et al. |
| 9,304,736 B1 | 4/2016 | Whiteley et al. |
| 9,338,242 B1 | 5/2016 | Suchland et al. |
| 9,338,493 B2 | 5/2016 | Van et al. |
| 9,390,724 B2 | 7/2016 | List |
| 9,418,658 B1 | 8/2016 | David et al. |
| 9,472,206 B2 | 10/2016 | Ady |
| 9,479,931 B2 | 10/2016 | Ortiz, Jr. et al. |
| 9,576,574 B2 | 2/2017 | Van Os |
| 9,639,608 B2 | 5/2017 | Freeman |
| 9,659,577 B1 | 5/2017 | Langhammer |
| 9,720,955 B1 | 8/2017 | Cao et al. |
| 9,747,895 B1 | 8/2017 | Jansche et al. |
| 9,792,281 B2 | 10/2017 | Sarikaya |
| 9,858,925 B2 | 1/2018 | Gruber et al. |
| 9,865,260 B1 | 1/2018 | Vuskovic et al. |
| 9,875,233 B1 | 1/2018 | Tomkins et al. |
| 9,875,741 B2 | 1/2018 | Gelfenbeyn et al. |
| 9,881,077 B1 | 1/2018 | Alfonseca et al. |
| 9,886,953 B2 | 2/2018 | Lemay et al. |
| 9,990,591 B2 | 6/2018 | Gelfenbeyn et al. |
| 10,042,032 B2 | 8/2018 | Scott et al. |
| 10,127,220 B2 | 11/2018 | Bellegarda et al. |
| 10,134,395 B2 | 11/2018 | Typrin |
| 10,199,051 B2 | 2/2019 | Binder et al. |
| 10,241,752 B2 | 3/2019 | Lemay et al. |
| 10,276,170 B2 | 4/2019 | Gruber et al. |
| 10,380,913 B2* | 8/2019 | Robitzkat ............... G06Q 10/20 |
| 10,462,422 B1 | 10/2019 | Harrison et al. |
| 10,511,808 B2 | 12/2019 | Harrison et al. |
| 10,572,231 B1* | 2/2020 | Graeb ..................... G06F 8/36 |
| 10,579,401 B2* | 3/2020 | Dawes ............ H04N 21/44218 |
| 10,628,635 B1* | 4/2020 | Carpenter, II .......... G10L 13/02 |
| 10,719,786 B1 | 7/2020 | Treseler et al. |
| 10,726,461 B2* | 7/2020 | Borucki ................ H04L 67/131 |
| 10,782,986 B2 | 9/2020 | Martin |
| 10,783,428 B2* | 9/2020 | Dolignon ............... G06N 20/00 |
| 10,803,050 B1 | 10/2020 | Salkola |
| 10,827,024 B1 | 11/2020 | Schissel et al. |
| 10,841,249 B2 | 11/2020 | Lim et al. |
| 10,854,206 B1 | 12/2020 | Liu et al. |
| 10,855,485 B1 | 12/2020 | Zhou et al. |
| 10,896,295 B1 | 1/2021 | Shenoy |
| 10,949,616 B1 | 3/2021 | Shenoy et al. |
| 10,957,329 B1 | 3/2021 | Liu et al. |
| 10,958,599 B1 | 3/2021 | Penov et al. |
| 10,977,258 B1 | 4/2021 | Liu et al. |
| 10,978,056 B1 | 4/2021 | Challa et al. |
| 11,003,669 B1 | 5/2021 | Nelson et al. |
| 11,010,129 B1* | 5/2021 | Rakshit ................... G06F 9/453 |
| 11,010,436 B1 | 5/2021 | Peng et al. |
| 11,038,974 B1 | 6/2021 | Koukoumidis et al. |
| 11,042,554 B1 | 6/2021 | Balakrishnan et al. |
| 11,086,858 B1 | 8/2021 | Koukoumidis et al. |
| 11,087,756 B1 | 8/2021 | Presant et al. |
| 11,093,551 B1 | 8/2021 | Natarajan et al. |
| 11,100,179 B1 | 8/2021 | Zhou et al. |
| 11,115,410 B1 | 9/2021 | Hanson et al. |
| 11,159,767 B1 | 10/2021 | Kamisetty et al. |
| 11,175,791 B1* | 11/2021 | Patnaikuni ............... G06F 3/017 |
| 11,200,742 B1* | 12/2021 | Post ....................... G06T 19/003 |
| 11,245,646 B1 | 2/2022 | Koukoumidis |
| 11,270,672 B1* | 3/2022 | Lee ........................ G06F 3/012 |
| 11,301,521 B1 | 4/2022 | Schissel et al. |
| 11,308,169 B1 | 4/2022 | Koukoumidis et al. |
| 11,341,335 B1 | 5/2022 | Crook et al. |
| 11,368,420 B1 | 6/2022 | Crook et al. |
| 2008/0240379 A1 | 10/2008 | Maislos et al. |
| 2008/0300884 A1 | 12/2008 | Smith |
| 2009/0282033 A1 | 11/2009 | Alshawi |
| 2011/0246383 A1 | 10/2011 | Gibson et al. |
| 2012/0245944 A1 | 9/2012 | Gruber et al. |
| 2012/0246191 A1 | 9/2012 | Xiong |
| 2012/0311126 A1 | 12/2012 | Jadallah et al. |
| 2013/0035930 A1 | 2/2013 | Ferrucci et al. |
| 2013/0268839 A1 | 10/2013 | Lefebvre et al. |
| 2013/0275138 A1 | 10/2013 | Gruber et al. |
| 2014/0012926 A1 | 1/2014 | Narayanan et al. |
| 2014/0032659 A1 | 1/2014 | Marini et al. |
| 2014/0129266 A1 | 5/2014 | Perl et al. |
| 2014/0164506 A1 | 6/2014 | Tesch et al. |
| 2014/0244712 A1 | 8/2014 | Walters et al. |
| 2014/0245192 A1* | 8/2014 | Chavez .................. G06Q 10/00 715/757 |
| 2014/0280017 A1 | 9/2014 | Indarapu et al. |
| 2014/0297284 A1 | 10/2014 | Gruber et al. |
| 2015/0037771 A1* | 2/2015 | Kaleal, III ............. G16H 50/30 434/257 |
| 2015/0081674 A1 | 3/2015 | Ali et al. |
| 2015/0142420 A1 | 5/2015 | Sarikaya et al. |
| 2015/0142704 A1 | 5/2015 | London |
| 2015/0169284 A1 | 6/2015 | Quast et al. |
| 2015/0169744 A1 | 6/2015 | Walkingshaw et al. |
| 2015/0179168 A1 | 6/2015 | Hakkani-Tur et al. |
| 2015/0186156 A1 | 7/2015 | Brown et al. |
| 2015/0192988 A1* | 7/2015 | Aleksiev ................. A63F 13/30 446/484 |
| 2015/0207765 A1 | 7/2015 | Brantingham et al. |
| 2015/0220888 A1 | 8/2015 | Iyer |
| 2015/0347375 A1 | 12/2015 | Tremblay et al. |
| 2016/0019290 A1 | 1/2016 | Ratnaparkhi et al. |
| 2016/0037311 A1 | 2/2016 | Cho |
| 2016/0063118 A1 | 3/2016 | Campbell et al. |
| 2016/0196491 A1 | 7/2016 | Chandrasekaran et al. |
| 2016/0225370 A1 | 8/2016 | Kannan et al. |
| 2016/0255082 A1 | 9/2016 | Rathod |
| 2016/0306505 A1 | 10/2016 | Vigneras et al. |
| 2016/0308799 A1 | 10/2016 | Schubert et al. |
| 2016/0328096 A1 | 11/2016 | Tran et al. |
| 2016/0378849 A1 | 12/2016 | Myslinski |
| 2016/0378861 A1 | 12/2016 | Eledath et al. |
| 2017/0026318 A1 | 1/2017 | Daniel et al. |
| 2017/0091168 A1 | 3/2017 | Bellegarda et al. |
| 2017/0092264 A1 | 3/2017 | Hakkani-Tur et al. |
| 2017/0132019 A1 | 5/2017 | Karashchuk et al. |
| 2017/0193390 A1 | 7/2017 | Weston et al. |
| 2017/0286401 A1 | 10/2017 | He et al. |
| 2017/0353469 A1 | 12/2017 | Selekman et al. |
| 2017/0358304 A1 | 12/2017 | Castillo Sanchez et al. |
| 2017/0359707 A1 | 12/2017 | Diaconu et al. |
| 2018/0013699 A1 | 1/2018 | Sapoznik et al. |
| 2018/0018562 A1 | 1/2018 | Jung |
| 2018/0018987 A1 | 1/2018 | Pass |
| 2018/0040020 A1 | 2/2018 | Kurian et al. |
| 2018/0052824 A1 | 2/2018 | Ferrydiansyah et al. |
| 2018/0054523 A1 | 2/2018 | Zhang et al. |
| 2018/0096071 A1 | 4/2018 | Green |
| 2018/0096072 A1 | 4/2018 | He et al. |
| 2018/0107917 A1 | 4/2018 | Hewavitharana et al. |
| 2018/0121508 A1 | 5/2018 | Halstvedt |
| 2018/0189629 A1 | 7/2018 | Yatziv et al. |
| 2018/0210874 A1 | 7/2018 | Fuxman et al. |
| 2018/0293484 A1 | 10/2018 | Wang et al. |
| 2018/0322681 A1* | 11/2018 | Inomata ................. A63F 13/211 |
| 2018/0329486 A1* | 11/2018 | Williams ............. G02B 27/017 |
| 2018/0329998 A1 | 11/2018 | Thomson et al. |
| 2018/0373547 A1* | 12/2018 | Dawes ............... H04N 21/4788 |
| 2019/0035390 A1 | 1/2019 | Howard et al. |
| 2019/0080698 A1 | 3/2019 | Miller |
| 2019/0082221 A1 | 3/2019 | Jain et al. |
| 2019/0087491 A1 | 3/2019 | Bax |
| 2019/0132265 A1 | 5/2019 | Nowak-Przygodzki et al. |
| 2019/0139150 A1 | 5/2019 | Brownhill et al. |
| 2019/0188450 A1* | 6/2019 | Spivack ................. G06V 40/103 |
| 2019/0213490 A1 | 7/2019 | White et al. |
| 2019/0311036 A1 | 10/2019 | Shanmugam et al. |
| 2019/0324527 A1 | 10/2019 | Presant et al. |

(56) References Cited

U.S. PATENT DOCUMENTS

| | | | |
|---|---|---|---|
| 2019/0324553 A1 | 10/2019 | Liu et al. | |
| 2019/0324780 A1 | 10/2019 | Zhu et al. | |
| 2019/0325042 A1 | 10/2019 | Yu et al. | |
| 2019/0325080 A1 | 10/2019 | Natarajan et al. | |
| 2019/0325081 A1 | 10/2019 | Liu et al. | |
| 2019/0325084 A1 | 10/2019 | Peng et al. | |
| 2019/0325864 A1 | 10/2019 | Anders et al. | |
| 2019/0327330 A1 | 10/2019 | Natarajan et al. | |
| 2019/0327331 A1 | 10/2019 | Natarajan et al. | |
| 2019/0332400 A1* | 10/2019 | Spoor | G06F 3/013 |
| 2019/0348033 A1 | 11/2019 | Chen et al. | |
| 2019/0361408 A1 | 11/2019 | Tokuchi | |
| 2020/0250874 A1* | 8/2020 | Assouline | G06N 3/08 |
| 2020/0376369 A1* | 12/2020 | Reddan | G10L 15/1815 |
| 2020/0410012 A1 | 12/2020 | Moon et al. | |
| 2021/0105340 A1* | 4/2021 | Grozdanov | G06F 8/76 |
| 2021/0117214 A1 | 4/2021 | Presant et al. | |
| 2021/0117479 A1 | 4/2021 | Liu et al. | |
| 2021/0117623 A1 | 4/2021 | Aly et al. | |
| 2021/0117624 A1 | 4/2021 | Aghajanyan et al. | |
| 2021/0117681 A1 | 4/2021 | Poddar et al. | |
| 2021/0117712 A1 | 4/2021 | Huang et al. | |
| 2021/0117780 A1 | 4/2021 | Malik et al. | |
| 2021/0118440 A1 | 4/2021 | Peng et al. | |
| 2021/0118442 A1 | 4/2021 | Poddar et al. | |
| 2021/0119955 A1 | 4/2021 | Penov et al. | |
| 2021/0120206 A1 | 4/2021 | Liu et al. | |
| 2021/0146253 A1* | 5/2021 | Liu | A63F 13/2145 |
| 2021/0252391 A1* | 8/2021 | Wheelbarger | G06T 7/73 |
| 2021/0304515 A1* | 9/2021 | Hutten | G06T 13/40 |
| 2021/0409234 A1 | 12/2021 | Behar | |
| 2022/0050696 A1 | 2/2022 | Presant et al. | |
| 2022/0129556 A1 | 4/2022 | Chen et al. | |
| 2022/0188361 A1 | 6/2022 | Botros et al. | |
| 2022/0199079 A1 | 6/2022 | Hanson et al. | |
| 2022/0210111 A1 | 6/2022 | Greenberg et al. | |

OTHER PUBLICATIONS

Co-pending U.S. Appl. No. 15/953,957, inventors Kemal; El Moujahid et al., filed Apr. 16, 2018.
Co-pending U.S. Appl. No. 15/967,193, inventors Testuggine; Davide et al., filed Apr. 30, 2018.
Co-pending U.S. Appl. No. 16/025,317, inventors Gupta; Sonal et al., filed Jul. 2, 2018.
Co-pending U.S. Appl. No. 16/048,072, inventor Salkola; Markku, filed Jul. 27, 2018.
Co-pending U.S. Appl. No. 16/048,101, inventor Salkola; Markku, filed Jul. 27, 2018.
Co-pending U.S. Appl. No. 16/057,414, inventors Kahn; Jeremy Gillmor et al., filed Aug. 7, 2018.
Co-pending U.S. Appl. No. 16/121,393, inventors Zhou; Zheng et al., filed Sep. 4, 2018.
Co-pending U.S. Appl. No. 16/135,752, inventors Liu; Xiaohu et al., filed Sep. 19, 2018.
Co-pending U.S. Appl. No. 16/168,536, inventors Dumoulin; Benoit F. et al., filed Oct. 23, 2018.
Co-pending U.S. Appl. No. 16/376,832, inventors Liu; Honglei et al., filed Apr. 5, 2019.
Co-pending U.S. Appl. No. 16/389,738, inventors Peng; Fuchun et al., filed Apr. 19, 2019.
Co-pending U.S. Appl. No. 16/389,769, inventors Liu; Honglei et al., filed Apr. 19, 2019.
Co-pending U.S. Appl. No. 16/434,010, inventors Dogaru; Sergiu et al., filed Jun. 6, 2019.
Co-pending U.S. Appl. No. 16/557,055, inventors Moon; Seungwhan et al., filed Aug. 30, 2019.
Co-pending U.S. Appl. No. 16/659,070, inventors Huang; Lisa Xiaoyi et al., filed Oct. 21, 2019.
Co-pending U.S. Appl. No. 16/659,203, inventors Huang; Lisa Xiaoyi et al., filed Oct. 21, 2019.
Co-pending U.S. Appl. No. 16/659,419, inventors Huang; Lisa Xiaoyi et al., filed Oct. 21, 2019.
Co-pending U.S. Appl. No. 16/742,769, inventors Liu; Xiaohu et al., filed Jan. 14, 2020.
Co-pending U.S. Appl. No. 16/790,497, inventors Gao; Yang et al., filed Feb. 13, 2020.
Co-pending U.S. Appl. No. 16/815,960, inventors Malik; Kshitiz et al., filed Mar. 11, 2020.
Co-pending U.S. Appl. No. 16/917,664, inventors Liu; Xiaohu et al., filed Jun. 30, 2020.
Co-pending U.S. Appl. No. 16/921,665, inventors Liu; Honglei et al., filed Jul. 6, 2020.
Co-pending U.S. Appl. No. 17/009,542, inventor Kottur; Satwik, filed Sep. 1, 2020.
Co-pending U.S. Appl. No. 17/139,363, inventors Cheng; Daniel Manhon et al., filed Dec. 31, 2020.
Co-pending U.S. Appl. No. 17/186,459, inventors Liu; Bing et al., filed Feb. 26, 2021.
Co-pending U.S. Appl. No. 17/336,716, inventors Chaland; Christophe et al., filed Jun. 2, 2021.
Co-pending U.S. Appl. No. 17/351,501, inventors Sethi; Pooja et al., filed Jun. 18, 2021.
Co-pending U.S. Appl. No. 17/391,765, inventors Pu; Yiming et al., filed Aug. 2, 2021.
Co-pending U.S. Appl. No. 17/394,096, inventors Wang; Emily et al., filed Aug. 4, 2021.
Co-pending U.S. Appl. No. 17/394, 159, inventors Santoro; Elizabeth Kelsey et al., filed Aug. 4, 2021.
Co-pending U.S. Appl. No. 17/407,922, inventors Pu; Yiming et al., filed Aug. 20, 2021.
Co-pending U.S. Appl. No. 17/504,276, inventors Kottur; Satwik et al., filed Oct. 18, 2021.
Co-pending U.S. Appl. No. 17/512,508, inventors Vincent; Joshuah et al., filed Oct. 27, 2021.
Co-pending U.S. Appl. No. 17/521,623, inventors Martinson; Leif Haven et al., filed Nov. 8, 2021.
Co-pending U.S. Appl. No. 17/525,510, inventors Shrivastava; Akshat et al., filed Nov. 12, 2021.
Co-pending U.S. Appl. No. 17/543,178, inventors Desai; Shrey et al., filed Dec. 6, 2021.
Co-pending U.S. Appl. No. 17/566,467, inventors Goel; Swati et al., filed Dec. 30, 2021.
Co-pending U.S. Appl. No. 17/725,540, inventors Surkov; Alexey Gennadyevich et al., filed Apr. 20, 2022.
Co-pending U.S. Appl. No. 17/732,104, inventors Bi; Sheng et al., filed Apr. 28, 2022.
Co-pending U.S. Appl. No. 17/747,345, inventors Desai; Shrey et al., filed May 18, 2022.
Co-pending U.S. Appl. No. 17/877,595, inventors Khorshid; Mokhtar Mohamed et al., filed Jul. 29, 2022.
USPTO—Unpublished U.S. Appl. No. 63/168,188; Moon, et al., filed on Mar. 30, 2021, 100 pages.

* cited by examiner

DYNAMICALLY MORPHING VIRTUAL ASSISTANT AVATARS FOR ASSISTANT SYSTEMS

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment. Augmented reality is related to two largely synonymous terms: mixed reality and computer-mediated reality.

Virtual reality (VR) is a simulated experience that can be similar to or completely different from the real world. Applications of virtual reality include entertainment (particularly video games), education (such as medical or military training) and business (such as virtual meetings). Standard virtual reality systems use either virtual reality headsets or multi-projected environments to generate realistic images, sounds and other sensations that simulate a user's physical presence in a virtual environment. A person using virtual reality equipment is able to look around the artificial world, move around in it, and interact with virtual features or items. The effect is commonly created by VR headsets consisting of a head-mounted display with a small screen in front of the eyes but can also be created through specially designed rooms with multiple large screens. Virtual reality typically incorporates auditory and video feedback but may also allow other types of sensory and force feedback through haptic technology.

SUMMARY OF PARTICULAR EMBODIMENTS

In particular embodiments, the assistant system may assist a user to obtain information or services. The assistant system may enable the user to interact with the assistant system via user inputs of various modalities (e.g., audio, voice, text, image, video, gesture, motion, location, orientation) in stateful and multi-turn conversations to receive assistance from the assistant system. As an example and not by way of limitation, the assistant system may support mono-modal inputs (e.g., only voice inputs), multi-modal inputs (e.g., voice inputs and text inputs), hybrid/multi-modal inputs, or any combination thereof. User inputs provided by a user may be associated with particular assistant-related tasks, and may include, for example, user requests (e.g., verbal requests for information or performance of an action), user interactions with an assistant application associated with the assistant system (e.g., selection of UI elements via touch or gesture), or any other type of suitable user input that may be detected and understood by the assistant system (e.g., user movements detected by the client device of the user). The assistant system may create and store a user profile comprising both personal and contextual information associated with the user. In particular embodiments, the assistant system may analyze the user input using natural-language understanding (NLU). The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation (NLG). Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, an augmented-reality (AR)/virtual-reality (VR) system may customize/morph an AR/VR virtual assistant avatar (hereinafter an "XR assistant avatar") as it follows around a user crossing different spaces, environments, applications, or surfaces. As an example and not by way of limitation, the customization may include changing the look and feel, voice, emotions, or other attributes. The customization of the XR assistant avatar may be triggered by the system responsive to different informative cues. As an example and not by way of limitation, such informative cues may include changes in application/game state, changes in the real-world or virtual environment, or the user's actions or context. The customization may also include rendering the XR assistant avatar in an animated/realistic way, e.g., humanlike. Thus, the XR assistant avatar may have motion and audio cues that are more animated and/or realistic to convey responses and emotions better to the user. In particular embodiments, the assistant system may provide a way for the user to interact via the XR assistant avatar in a conversation manner (i.e., natural-language dialog), where the natural-language responses provided by the XR assistant avatar may customize to the specific application the user is engaging with. Although this disclosure describes customizing particular avatars by particular systems (e.g., the AR/VR system) in a particular manner, this disclosure contemplates customizing any suitable avatar by any suitable system (e.g., the assistant system) in any suitable manner.

In particular embodiments, the AR/VR system may render, for one or more displays of an extended-reality (XR) display device, a first output image of an XR assistant avatar within an environment in a field of view (FOV) of a first user of the XR display device. The XR assistant avatar may have a first form and a first pose with respect to the first user. The XR assistant avatar may be interactable by the first user to access an assistant system. In particular embodiments, the AR/VR system may detect a change in a context of the first user with respect to the environment. The AR/VR system may then determine whether to morph the XR assistant avatar based on the detected change in the context of the first user. In particular embodiments, the AR/VR system may further render, for the one or more displays of the XR display device, a second output image of the XR assistant avatar. The XR assistant avatar may be morphed to have a second form and a second pose with respect to the first user responsive to determining to morph the XR assistant avatar based on the detected change in the context of the first user.

Certain technical challenges exist for dynamically morphing virtual assistant avatar. One technical challenge may include determining when to customize the XR assistant avatar. The solution presented by the embodiments disclosed herein to address this challenge may be customizing the XR assistant avatar responsive to the change of context as the change of content may provide informative cues useful for determining what customizations may be more suitable, interesting, and engaging for a user.

Certain embodiments disclosed herein may provide one or more technical advantages. A technical advantage of the embodiments may include improving user experience with the assistant system as the XR assistant avatar may be customized according to the user's context such that the user may find the assistant system more intelligent and interactive. Certain embodiments disclosed herein may provide none, some, or all of the above technical advantages. One or more other technical advantages may be readily apparent to one skilled in the art in view of the figures, descriptions, and claims of the present disclosure.

In particular embodiments, the AR/VR system may integrate first-party and third-party applications into the assistant system via instructions provided to application developers on how to render the XR assistant avatar in the AR/VR application environments. The XR assistant avatar may be rendered as an "embodied assistant" that transfers around with a user, in and out of applications, to different VR environments, or into real-world environments when the user puts on XR devices, etc. The XR assistant avatar may also be customized by each user within a specific application, subject to what features are provided by the application developer. With the application integration, the XR assistant avatar may provide various benefits to both application developers and users, including business and creator support, facilitation of commerce for applications, and proactive outreach. Although this disclosure describes integrating particular applications by morphing particular avatars by particular systems (e.g., the AR/VR system) in a particular manner, this disclosure contemplates integrating any suitable application by morphing any suitable avatar by any suitable system (e.g., the assistant system) in any suitable manner.

In particular embodiments, the AR/VR system may render, for one or more displays of an extended-reality (XR) display device, a first output image of an XR assistant avatar within a first environment associated with a first XR application. The XR assistant avatar may have a first form according to a first rendering specification associated with the first XR application. In particular embodiments, the XR assistant avatar may be interactable by a first user of the XR display device to access an assistant system. The AR/VR system may then receive an indication that the first user is switching from the first XR application to a second XR application. The AR/VR system may then access a second rendering specification associated with the second XR application. In particular embodiments, the AR/VR system may further render, for one or more displays of a second XR display device, a second output image of the XR assistant avatar within a second environment associated with the second XR application. The XR assistant avatar may be rendered to have a second form according to the second rendering specification associated with the second XR application.

Certain technical challenges exist for integrating applications by dynamically morphing virtual assistant avatar. One technical challenge may include morphing the XR assistant avatar responsive to the user switching between different applications. The solution presented by the embodiments disclosed herein to address this challenge may be determining the morphing of the XR assistant avatar based on rendering specification specific to the XR display device and the application being switched to as the rendering specification may comprise instructions specified by the application developer on how to morph the XR assistant avatar under various scenario with different contexts.

Certain embodiments disclosed herein may provide one or more technical advantages. A technical advantage of the embodiments may include enabling application developers to easily incorporate functions to their applications as the assistant SDK may allow the application developers to directly plug in these functionalities into their applications without having to build them out. The assistant SDK may additionally allow application developers to add restrictions to the incorporated functions. Another technical advantage of the embodiments may include providing proactive outreach for both application developers and users as the XR assistant avatar may deliver relevant information at the right time to users and intelligent suggestions to the application developer regarding how to integrate their applications into the metaverse. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
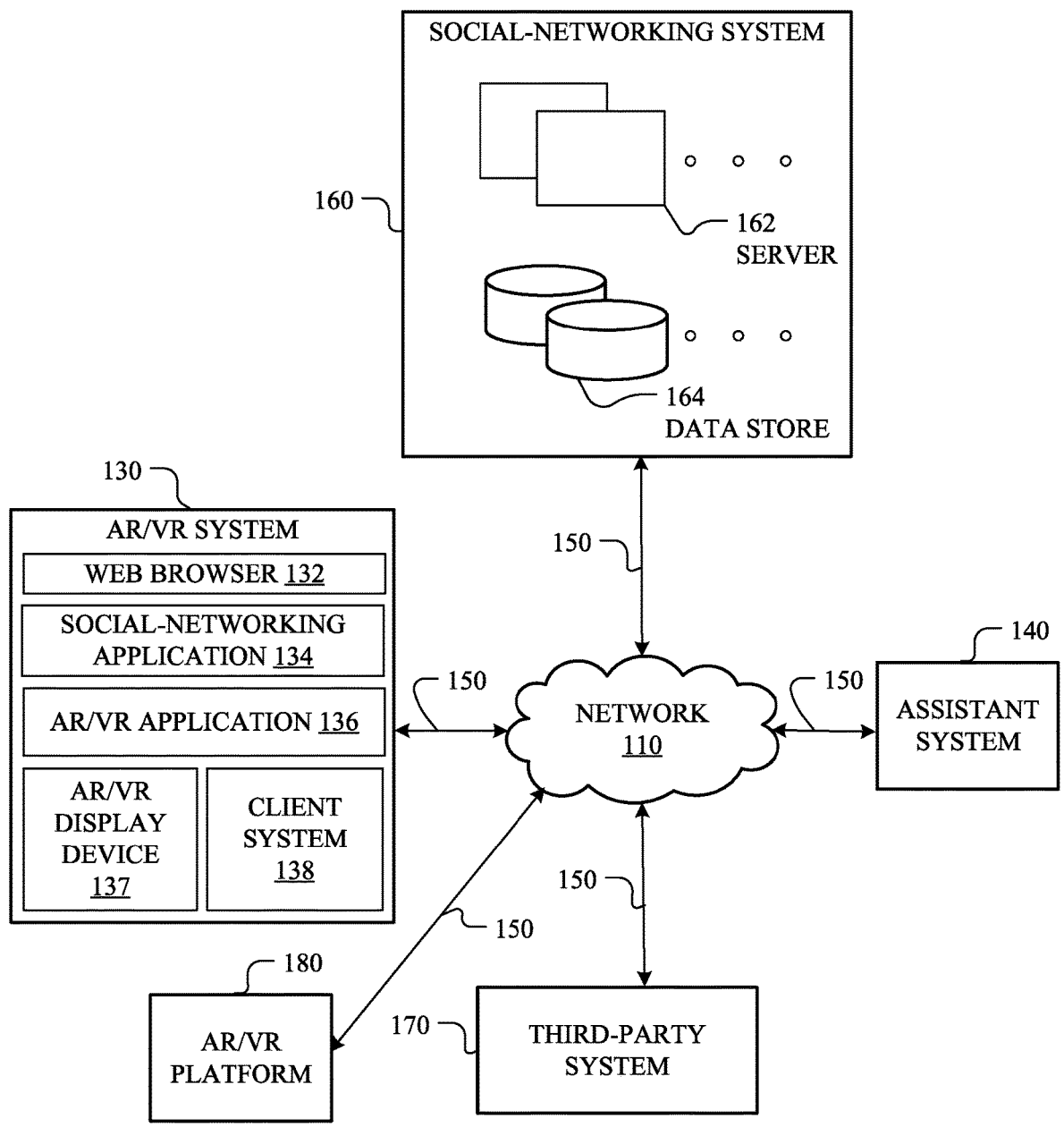
FIG. 1 illustrates an example network environment associated with an assistant system.

FIG. 1 illustrates an example network environment 100 associated with an augmented-reality (AR)/virtual-reality (VR) system 130. Network environment 100 includes the AR/VR system 130, an assistant system 140, a social-networking system 160, a third-party system 170, and an AR/VR platform 180 connected to each other by a network 110. Although FIG. 1 illustrates a particular arrangement of an AR/VR system 130, an assistant system 140, an AR/VR platform 180, a social-networking system 160, a third-party system 170, and a network 110, this disclosure contemplates any suitable arrangement of an AR/VR system 130, an assistant system 140, an AR/VR platform 180, a social-networking system 160, a third-party system 170, and a network 110. As an example and not by way of limitation, two or more of an AR/VR system 130, an assistant system 140, a social-networking system 160, an AR/VR platform 180, and a third-party system 170 may be connected to each other directly, bypassing a network 110. As another example, two or more of an AR/VR system 130, an assistant system 140, an AR/VR platform 180, a social-networking system 160, and a third-party system 170 may be physically or logically co-located with each other in whole or in part. Moreover, although FIG. 1 illustrates a particular number of AR/VR systems 130, assistant systems 140, AR/VR platforms 180, social-networking systems 160, third-party systems 170, and networks 110, this disclosure contemplates any suitable number of AR/VR systems 130, assistant systems 140, AR/VR platforms 180, social-networking systems 160, third-party systems 170, and networks 110. As an example and not by way of limitation, network environment 100 may include multiple AR/VR systems 130, assistant system 140, AR/VR platforms 180, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect an AR/VR system 130, an assistant system 140, an AR/VR platform 180, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, an AR/VR system 130 may be any suitable electronic device including hardware, software, or embedded logic components, or a combination of two or more such components, and may be capable of carrying out the functionalities implemented or supported by an AR/VR system 130. As an example and not by way of limitation, the AR/VR system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual-reality (VR) headset, other suitable electronic device, or any suitable combination thereof. This disclosure contemplates any suitable AR/VR systems 130. In particular embodiments, an AR/VR system 130 may enable a network user at an AR/VR system 130 to access a network 110. The AR/VR system 130 may also enable the user to communicate with other users at other AR/VR systems 130.

In particular embodiments, an AR/VR system 130 may include a web browser 132, and may have one or more add-ons, plug-ins, or other extensions. A user at an AR/VR system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to an AR/VR system 130 one or more Hyper Text Markup Language (HTML) files responsive to the HTTP request. The AR/VR system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, an AR/VR system 130 may include a social-networking application 134 installed on the AR/VR system 130. A user at an AR/VR system 130 may use the social-networking application 134 to access an online social network. The user at the AR/VR system 130 may use the social-networking application 134 to communicate with the user's social connections (e.g., friends, followers, followed accounts, contacts, etc.). The user at the AR/VR system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, an AR/VR system 130 may include an AR/VR application 136. As an example and not by way of limitation, an AR/VR application 136 may be able to incorporate AR/VR renderings of real-world objects from the real-world environment into an AR/VR environment. A user at an AR/VR system 130 may use the AR/VR applications 136 to interact with the AR/VR platform 180 or the assistant system 140. In particular embodiments, the AR/VR application 136 may comprise a stand-alone application. In particular embodiments, the AR/VR application 136 may be integrated into the social-networking application 134 or another suitable application (e.g., a messaging application). In particular embodiments, the AR/VR application 136 may be also integrated into the AR/VR system 130, the assistant system 140, an AR/VR hardware device, or any other suitable hardware devices. In particular embodiments, the AR/VR application 136 may be also part of the AR/VR platform 180 or assistant system 140. In particular embodiments, the AR/VR application 136 may be accessed via the web browser 132. In particular embodiments, the user may interact with the AR/VR platform 180 or assistant system 140 by providing user input to the AR/VR application 136 via various modalities (e.g., audio, voice, text, vision, image, video, gesture, motion, activity, location, orientation). The AR/VR application 136 may communicate the user input to the AR/VR platform 180 or assistant system 140. Based on the user input, the AR/VR platform 180 or assistant system 140 may generate responses. The AR/VR platform 180 or assistant system 140 may send the generated responses to the AR/VR application 136. The AR/VR application 136 may then present the responses to the user at the AR/VR system 130 via various modalities (e.g., audio, text, image, video, and VR/AR rendering). As an example and not by way of limitation, the user may interact with the AR/VR platform 180 or assistant system 140 by providing a user input (e.g., a verbal request for information of an object in the AR/VR environment) via a microphone of the AR/VR system 130. The AR/VR application 136 may then communicate the user input to the AR/VR platform 180 or assistant system 140 over network 110. The AR/VR platform 180 or assistant system 140 may accordingly analyze the user input, generate a response based on the analysis of the user input, and communicate the generated response back to the AR/VR application 136. The AR/VR application 136 may then present the generated response to the user in any suitable manner (e.g., displaying a text-based push notification and/ or AR/VR rendering(s) illustrating the information of the object on a display of the AR/VR system 130).

In particular embodiments, an AR/VR system 130 may include an AR/VR display device 137 and, optionally, a client system 138. The AR/VR display device 137 may be configured to render outputs generated by the AR/VR platform 180 or assistant system 140 to the user. The client system 138 may comprise a companion device. The client system 138 may be configured to perform computations associated with particular tasks (e.g., communications with the AR/VR platform 140) locally (i.e., on-device) on the client system 138 in particular circumstances (e.g., when the AR/VR display device 137 is unable to perform said computations). In particular embodiments, the AR/VR system 130, the AR/VR display device 137, and/or the client system 138 may each be a suitable electronic device including hardware, software, or embedded logic components, or a combination of two or more such components, and may be capable of carrying out, individually or cooperatively, the functionalities implemented or supported by the AR/VR system 130 described herein. As an example and not by way of limitation, the AR/VR system 130, the AR/VR display device 137, and/or the client system 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual-reality (VR) headset, augmented-reality (AR) smart glasses, other suitable electronic device, or any suitable combination thereof. In particular embodiments, the AR/VR display device 137 may comprise a VR headset and the client system 138 may comprise a smart phone. In particular embodiments, the AR/VR display device 137 may comprise AR smart glasses and the client system 138 may comprise a smart phone.

In particular embodiments, a user may interact with the AR/VR platform 180 using the AR/VR display device 137 or the client system 138, individually or in combination. In particular embodiments, an application on the AR/VR display device 137 may be configured to receive user input from the user, and a companion application on the client system 138 may be configured to handle user inputs (e.g., user requests) received by the application on the AR/VR display device 137. In particular embodiments, the AR/VR display device 137 and the client system 138 may be associated with each other (i.e., paired) via one or more wireless communication protocols (e.g., Bluetooth).

The following example workflow illustrates how an AR/VR display device 137 and a client system 138 may handle a user input provided by a user. In this example, an application on the AR/VR display device 137 may receive a user input comprising a user request directed to the VR display device 137. The application on the AR/VR display device 137 may then determine a status of a wireless connection (i.e., tethering status) between the AR/VR display device 137 and the client system 138. If a wireless connection between the AR/VR display device 137 and the client system 138 is not available, the application on the AR/VR display device 137 may communicate the user request (optionally including additional data and/or contextual information available to the AR/VR display device 137) to the AR/VR platform 180 or assistant system 140 via the network 110. The AR/VR platform 180 or assistant system 140 may then generate a response to the user request and communicate the generated response back to the AR/VR display device 137. The AR/VR display device 137 may then present the response to the user in any suitable manner. Alternatively, if a wireless connection between the AR/VR display device 137 and the client system 138 is available, the application on the AR/VR display device 137 may communicate the user request (optionally including additional data and/or contextual information available to the AR/VR display device 137) to the companion application on the client system 138 via the wireless connection. The companion application on the client system 138 may then communicate the user request (optionally including additional data and/or contextual information available to the client system 138) to the AR/VR platform 180 or assistant system 140 via the network 110. The AR/VR platform 180 or assistant system 140 may then generate a response to the user request and communicate the generated response back to the client system 138. The companion application on the client system 138 may then communicate the generated response to the application on the AR/VR display device 137. The AR/VR display device 137 may then present the response to the user in any suitable manner. In the preceding example workflow, the AR/VR display device 137 and the client system 138 may each perform one or more computations and/or processes at each respective step of the workflow. In particular embodiments, performance of the computations and/or processes disclosed herein may be adaptively switched between the AR/VR display device 137 and the client system 138 based at least in part on a device state of the AR/VR display device 137 and/or the client system 138, a task associated with the user input, and/or one or more additional factors. As an example and not by way of limitation, one factor may be signal strength of the wireless connection between the AR/VR display device 137 and the client system 138. For example, if the signal strength of the wireless connection between the AR/VR display device 137 and the client system 138 is strong, the computations and processes may be adaptively switched to be substantially performed by the client system 138 in order to, for example, benefit from the greater processing power of the CPU of the client system 138. Alternatively, if the signal strength of the wireless connection between the AR/VR display device 137 and the client system 138 is weak, the computations and processes may be adaptively switched to be substantially performed by the AR/VR display device 137 in a standalone manner. In particular embodiments, if the AR/VR system 130 does not comprise a client system 138, the aforementioned computations and processes may be performed solely by the AR/VR display device 137 in a standalone manner.

In particular embodiments, the AR/VR platform 180 may comprise a backend platform or server for the AR/VR system 130. The AR/VR platform 180 may interact with the AR/VR system 130, and/or the assistant system 140, and/or the social-networking system 160, and/or the third-party system 170 when executing tasks.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, an AR/VR system 130 may access the social-networking system 160 using a web browser 132 or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable an AR/VR system 130, an assistant system 140, a social-networking system 160, an AR/VR platform 180, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. As an example and not by way of limitation, the entity operating the third-party system 170 may be a developer for one or more AR/VR applications 136. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. As an example and not by way of limitation, the third-party content object provider may be a developer for one or more AR/VR applications 136. A third-party content object provider may include one or more sources of content objects, which may be communicated to an AR/VR system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. As yet another example and not by way of limitation, content objects may include one or more AR/VR applications 136. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from an AR/VR system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more AR/VR systems 130 or one or more third-party systems 170 via a network 110. The web server may include a mail server or other messaging functionality for receiving and routing messages between the social-networking system 160 and one or more AR/VR systems 130. An API-request server may allow, for example, an AR/VR platform 180, an assistant system 140, or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to an AR/VR system 130. Information may be pushed to an AR/VR system 130 as notifications, or information may be pulled from an AR/VR system 130 responsive to a user input comprising a user request received from an AR/VR system 130. Authorization servers may be used to enforce one or more privacy settings of the users of the social-networking system 160. A privacy setting of a user may determine how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from AR/VR systems 130 associated with users. Advertisement-pricing modules may combine social information, the current time, location information, or other suitable information to provide relevant advertisements, in the form of notifications, to a user.

Assistant Systems

Figure 2:
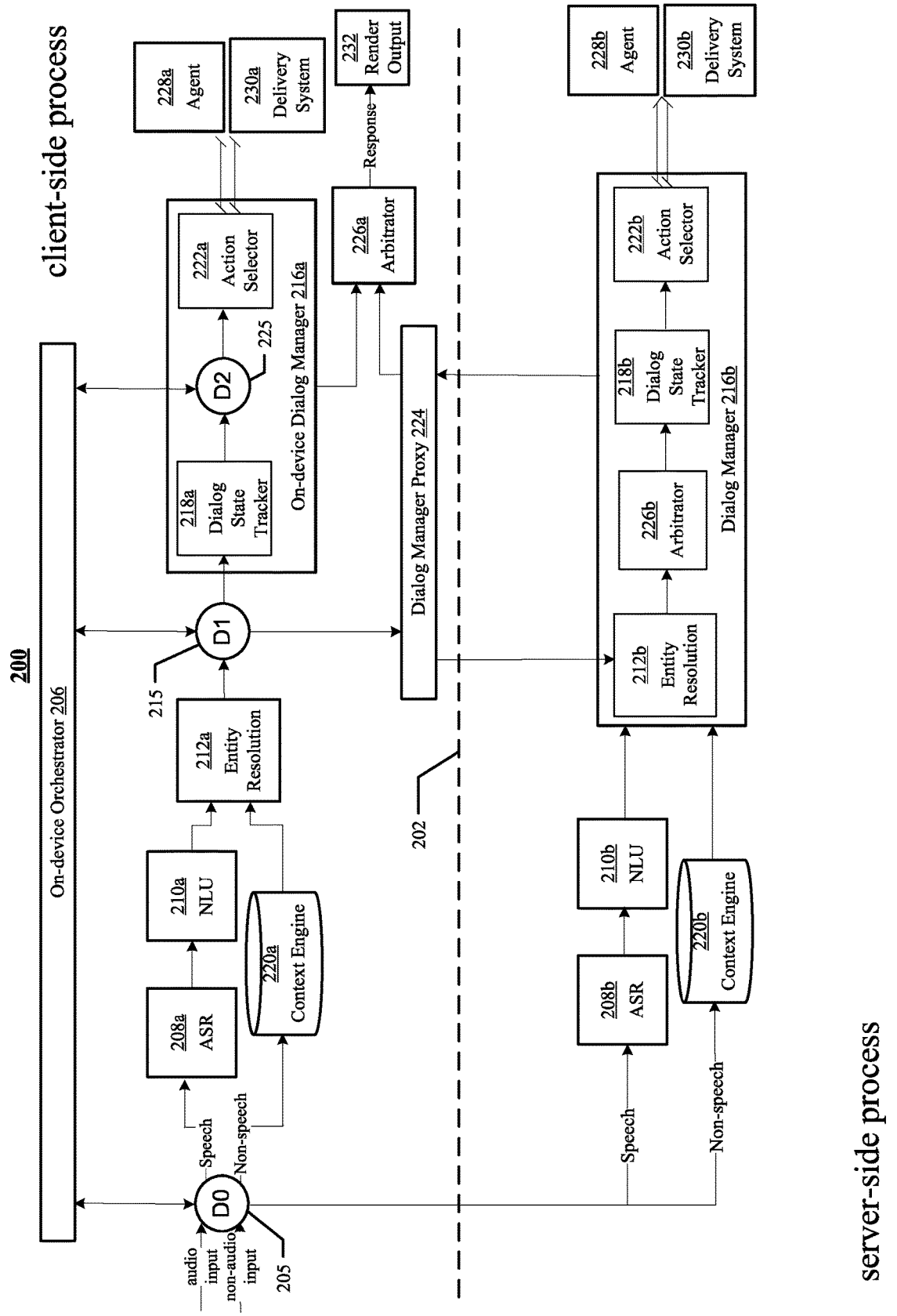
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side processes and server-side processes which may operate in various operational modes. In FIG. 2, the client-side process is illustrated above the dashed line 202 whereas the server-side process is illustrated below the dashed line 202. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a workflow in which the assistant system 140 processes a user input and provides assistance to the user by primarily or exclusively performing server-side processes on one or more remote servers (e.g., a server associated with assistant system 140). As illustrated in FIG. 2, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) processes, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indicated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable privacy policies). For example, if one or more privacy constraints limits or precludes particular data from being transmitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be determined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or immediate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant system 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 206 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limitation, with reference to the workflow architecture illustrated in FIG. 2, after a user input is received from a user, the on-device orchestrator 206 may determine, at decision point (DO) 205, whether to begin processing the user input in the first operational mode (i.e., on-device mode), the second operational mode (i.e., cloud mode), or the third operational mode (i.e., blended mode). For example, at decision point (DO) 205, the on-device orchestrator 206 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (DO) 205, the on-device orchestrator 206 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 206 determines at decision point (DO) 205 that the user input should be processed using the first operational mode (i.e., on-device mode) or the third operational mode (i.e., blended mode), the client-side process may continue as illustrated in FIG. 2. As an example and not by way of limitation, if the user input comprises speech data, the speech data may be received at a local automatic speech recognition (ASR) module 208*a* on the client system 130. The ASR module 208*a* may allow a user to dictate and have speech transcribed as written text, have a document synthesized as an audio stream, or issue commands that are recognized as such by the system.

In particular embodiments, the output of the ASR module 208*a* may be sent to a local natural-language understanding (NLU) module 210*a*. The NLU module 210*a* may perform named entity resolution (NER), or named entity resolution may be performed by the entity resolution module 212*a*, as described below. In particular embodiments, one or more of an intent, a slot, or a domain may be an output of the NLU module 210a.

In particular embodiments, the user input may comprise non-speech data, which may be received at a local context engine 220a. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise object detection, scene recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset, and which may be data associated with linear and angular motions (e.g., measurements associated with a user's body movements). In particular embodiments, the context engine 220a may determine various types of events and context based on the non-speech data.

In particular embodiments, the outputs of the NLU module 210a and/or the context engine 220a may be sent to an entity resolution module 212a. The entity resolution module 212a may resolve entities associated with one or more slots output by NLU module 210a. In particular embodiments, each resolved entity may be associated with one or more entity identifiers. As an example and not by way of limitation, an identifier may comprise a unique user identifier (ID) corresponding to a particular user (e.g., a unique username or user ID number for the social-networking system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (DO) 205, the on-device orchestrator 206 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 208b on a remote server (e.g., the server associated with assistant system 140). The ASR module 208b may allow a user to dictate and have speech transcribed as written text, have a document synthesized as an audio stream, or issue commands that are recognized as such by the system.

In particular embodiments, the output of the ASR module 208b may be sent to a remote natural-language understanding (NLU) module 210b. In particular embodiments, the NLU module 210b may perform named entity resolution (NER) or named entity resolution may be performed by entity resolution module 212b of dialog manager module 216b as described below. In particular embodiments, one or more of an intent, a slot, or a domain may be an output of the NLU module 210b.

In particular embodiments, the user input may comprise non-speech data, which may be received at a remote context engine 220b. In particular embodiments, the remote context engine 220b may determine various types of events and context based on the non-speech data. In particular embodiments, the output of the NLU module 210b and/or the context engine 220b may be sent to a remote dialog manager 216b.

In particular embodiments, as discussed above, an on-device orchestrator 206 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 2, after the entity resolution module 212a generates an output or a null output, the on-device orchestrator 206 may determine, at decision point (D1) 215, whether to continue processing the user input in the first operational mode (i.e., on-device mode), the second operational mode (i.e., cloud mode), or the third operational mode (i.e., blended mode). For example, at decision point (D1) 215, the on-device orchestrator 206 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 206 may select the third operational mode (i.e., blended mode) to process the user input associated with a messaging request. As yet another example, at decision point (D1) 215, the on-device orchestrator 206 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 206 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 206 determines at decision point (D1) 215 that processing should continue using the first operational mode (i.e., on-device mode) or the third operational mode (i.e., blended mode), the client-side process may continue as illustrated in FIG. 2. As an example and not by way of limitation, the output from the entity resolution module 212a may be sent to an on-device dialog manager 216a. In particular embodiments, the on-device dialog manager 216a may comprise a dialog state tracker 218a and an action selector 222a. The on-device dialog manager 216a may have complex dialog logic and product-related business logic to manage the dialog state and flow of the conversation between the user and the assistant system 140. The on-device dialog manager 216a may include full functionality for end-to-end integration and multi-turn support (e.g., confirmation, disambiguation). The on-device dialog manager 216a may also be lightweight with respect to computing limitations and resources including memory, computation (CPU), and binary size constraints. The on-device dialog manager 216a may also be scalable to improve developer experience. In particular embodiments, the on-device dialog manager 216a may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 216a may further conduct false trigger mitigation. Implementation of false trigger mitigation may detect and prevent false triggers from user inputs which would otherwise invoke the assistant system 140 (e.g., an unintended wakeword) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 216a may implement false trigger mitigation based on a nonsense detector. If the nonsense detector determines with a high confidence that a received wake-word is not logically and/or contextually sensible at the point in time at which it was received from the user, the on-device dialog manager 216a may determine that the user did not intend to invoke the assistant system 140.

In particular embodiments, due to a limited computing power of the client system 130, the on-device dialog manager 216a may conduct on-device learning based on learning algorithms particularly tailored for client system 130. As an example and not by way of limitation, federated learning techniques may be implemented by the on-device dialog manager 216a. Federated learning is a specific category of distributed machine learning techniques which may train machine-learning models using decentralized data stored on end devices (e.g., mobile phones). In particular embodiments, the on-device dialog manager 216a may use federated user representation learning model to extend existing neural-network personalization techniques to implementation of federated learning by the on-device dialog manager 216a. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 216a may use an active federated learning model, which may transmit a global model trained on the remote server to client systems 130 and calculate gradients locally on the client systems 130. Active federated learning may enable the on-device dialog manager 216a to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 218a may track state changes over time as a user interacts with the world and the assistant system 140 interacts with the user. As an example and not by way of limitation, the dialog state tracker 218a may track, for example, what the user is talking about, whom the user is with, where the user is, what tasks are currently in progress, and where the user's gaze is at subject to applicable privacy policies.

In particular embodiments, at decision point (D1) 215, the on-device orchestrator 206 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 206 may determine at decision point (D1) 215 to use the third operational mode (i.e., blended mode). In particular embodiments, the on-device orchestrator 206 may cause the outputs from the NLU module 210a, the context engine 220a, and the entity resolution module 212a, via a dialog manager proxy 224, to be forwarded to an entity resolution module 212b of the remote dialog manager 216b to continue the processing. The dialog manager proxy 224 may be a communication channel for information/events exchange between the client system 130 and the server. In particular embodiments, the dialog manager 216b may additionally comprise a remote arbitrator 226b, a remote dialog state tracker 218b, and a remote action selector 222b. In particular embodiments, the assistant system 140 may have started processing a user input with the second operational mode (i.e., cloud mode) at decision point (D1) 205 and the on-device orchestrator 206 may determine to continue processing the user input based on the second operational mode (i.e., cloud mode) at decision point (D1) 215. Accordingly, the output from the NLU module 210b and the context engine 220b may be received at the remote entity resolution module 212b. The remote entity resolution module 212b may have similar functionality as the local entity resolution module 212a, which may comprise resolving entities associated with the slots. In particular embodiments, the entity resolution module 212b may access one or more of the social graph, the knowledge graph, or the concept graph when resolving the entities. The output from the entity resolution module 212b may be received at the arbitrator 226b.

In particular embodiments, the remote arbitrator 226b may be responsible for choosing between client-side and server-side upstream results (e.g., results from the NLU module 210a/b, results from the entity resolution module 212a/b, and results from the context engine 220a/b). The arbitrator 226b may send the selected upstream results to the remote dialog state tracker 218b. In particular embodiments, similarly to the local dialog state tracker 218a, the remote dialog state tracker 218b may convert the upstream results into candidate tasks using task specifications and resolve arguments with entity resolution.

In particular embodiments, at decision point (D2) 225, the on-device orchestrator 206 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 225 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 206 determines to continue processing the user input based on the first operational mode (i.e., on-device mode), the output from the dialog state tracker 218a may be received at the action selector 222a.

In particular embodiments, at decision point (D2) 225, the on-device orchestrator 206 may determine to forward the user input to the remote server and continue processing the user input in either the second operational mode (i.e., cloud mode) or the third operational mode (i.e., blended mode). The assistant system 140 may create a programmatic/predefined task with the current task state and forward it to the server, which may be received at the action selector 222b. In particular embodiments, the assistant system 140 may have started processing the user input in the second operational mode (i.e., cloud mode), and the on-device orchestrator 206 may determine to continue processing the user input in the second operational mode (i.e., cloud mode) at decision point (D2) 225. Accordingly, the output from the dialog state tracker 218b may be received at the action selector 222b.

In particular embodiments, the action selector 222a/b may perform interaction management. The action selector 222a/b may determine and trigger a set of general executable actions. The actions may be executed either on the client system 130 or at the remote server. As an example and not by way of limitation, these actions may include providing information or suggestions to the user. In particular embodiments, the actions may interact with agents 228a/b, users, and/or the assistant system 140 itself. These actions may comprise actions including one or more of a slot request, a confirmation, a disambiguation, or an agent execution. The actions may be independent of the underlying implementation of the action selector 222a/b. For more complicated scenarios such as, for example, multi-turn tasks or tasks with complex business logic, the local action selector 222a may call one or more local agents 228a, and the remote action selector 222b may call one or more remote agents 228b to execute the actions. Agents 228a/b may be invoked via task ID, and any actions may be routed to the correct agent 228a/b using that task ID. In particular embodiments, an agent 228a/b may be configured to serve as a broker across a plurality of content providers for one domain. A content provider may be an entity responsible for carrying out an action associated with an intent or completing a task associated with the intent. In particular embodiments, agents 228a/b may provide several functionalities for the assistant system 140 including, for example, native template generation, task specific business logic, and querying external APIs. When executing actions for a task, agents 228a/b may use context from the dialog state tracker 218a/b, and may also update the dialog state tracker 218a/b. In particular embodiments, agents 228a/b may also generate partial payloads from a dialog act.

In particular embodiments, the local agents 228a may have different implementations to be compiled/registered for different platforms (e.g., smart glasses versus a VR headset). In particular embodiments, multiple device-specific implementations (e.g., real-time calls for a client system 130 or a messaging application on the client system 130) may be handled internally by a single agent 228a. Alternatively, device-specific implementations may be handled by multiple agents 228a associated with multiple domains. As an example and not by way of limitation, calling an agent 228a on smart glasses may be implemented in a different manner than calling an agent 228a on a smart phone. Different platforms may also utilize varying numbers of agents 228a. The agents 228a may also be cross-platform (i.e., different operating systems on the client system 130). In addition, the agents 228a may have minimized startup time or binary size impact. Local agents 228a may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 222a may call a local delivery system 230a for executing the actions, and the remote action selector 222b may call a remote delivery system 230b for executing the actions. The delivery system 230a/b may deliver a predefined event upon receiving triggering signals from the dialog state tracker 218a/b by executing corresponding actions. The delivery system 230a/b may ensure that events get delivered to a host with a living connection. As an example and not by way of limitation, the delivery system 230a/b may broadcast to all online devices that belong to one user. As another example and not by way of limitation, the delivery system 230a/b may deliver events to target-specific devices. The delivery system 230a/b may further render a payload using up-to-date device context.

In particular embodiments, the on-device dialog manager 216a may additionally comprise a separate local action execution module, and the remote dialog manager 216b may additionally comprise a separate remote action execution module. The local execution module and the remote action execution module may have similar functionality. In particular embodiments, the action execution module may call the agents 228a/b to execute tasks. The action execution module may additionally perform a set of general executable actions determined by the action selector 222a/b. The set of executable actions may interact with agents 228a/b, users, and the assistant system 140 itself via the delivery system 230a/b.

In particular embodiments, if the user input is handled using the first operational mode (i.e., on-device mode), results from the agents 228a and/or the delivery system 230a may be returned to the on-device dialog manager 216a. The on-device dialog manager 216a may then instruct a local arbitrator 226a to generate a final response based on these results. The arbitrator 226a may aggregate the results and evaluate them. As an example and not by way of limitation, the arbitrator 226a may rank and select a best result for responding to the user input. If the user request is handled in the second operational mode (i.e., cloud mode), the results from the agents 228b and/or the delivery system 230b may be returned to the remote dialog manager 216b. The remote dialog manager 216b may instruct, via the dialog manager proxy 224, the arbitrator 226a to generate the final response based on these results. Similarly, the arbitrator 226a may analyze the results and select the best result to provide to the user. If the user input is handled based on the third operational mode (i.e., blended mode), the client-side results and server-side results (e.g., from agents 228a/b and/or delivery system 230a/b) may both be provided to the arbitrator 226a by the on-device dialog manager 216a and remote dialog manager 216b, respectively. The arbitrator 226 may then choose between the client-side and server-side side results to determine the final result to be presented to the user. In particular embodiments, the logic to decide between these results may depend on the specific use-case.

In particular embodiments, the local arbitrator 226a may generate a response based on the final result and send it to a render output module 232. The render output module 232 may determine how to render the output in a way that is suitable for the client system 130. As an example and not by way of limitation, for a VR headset or AR smart glasses, the render output module 232 may determine to render the output using a visual-based modality (e.g., an image or a video clip) that may be displayed via the VR headset or AR smart glasses. As another example, the response may be rendered as audio signals that may be played by the user via a VR headset or AR smart glasses. As yet another example, the response may be rendered as augmented-reality data for enhancing user experience.

In particular embodiments, in addition to determining an operational mode to process the user input, the on-device orchestrator 206 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 206 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, recognize interesting objects in the world through a combination of existing machine-learning models and one-shot learning, recognize an interesting moment and auto-capture it, achieve semantic understanding over multiple visual frames across different episodes of time, provide platform support for additional capabilities in places or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of places and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 3:
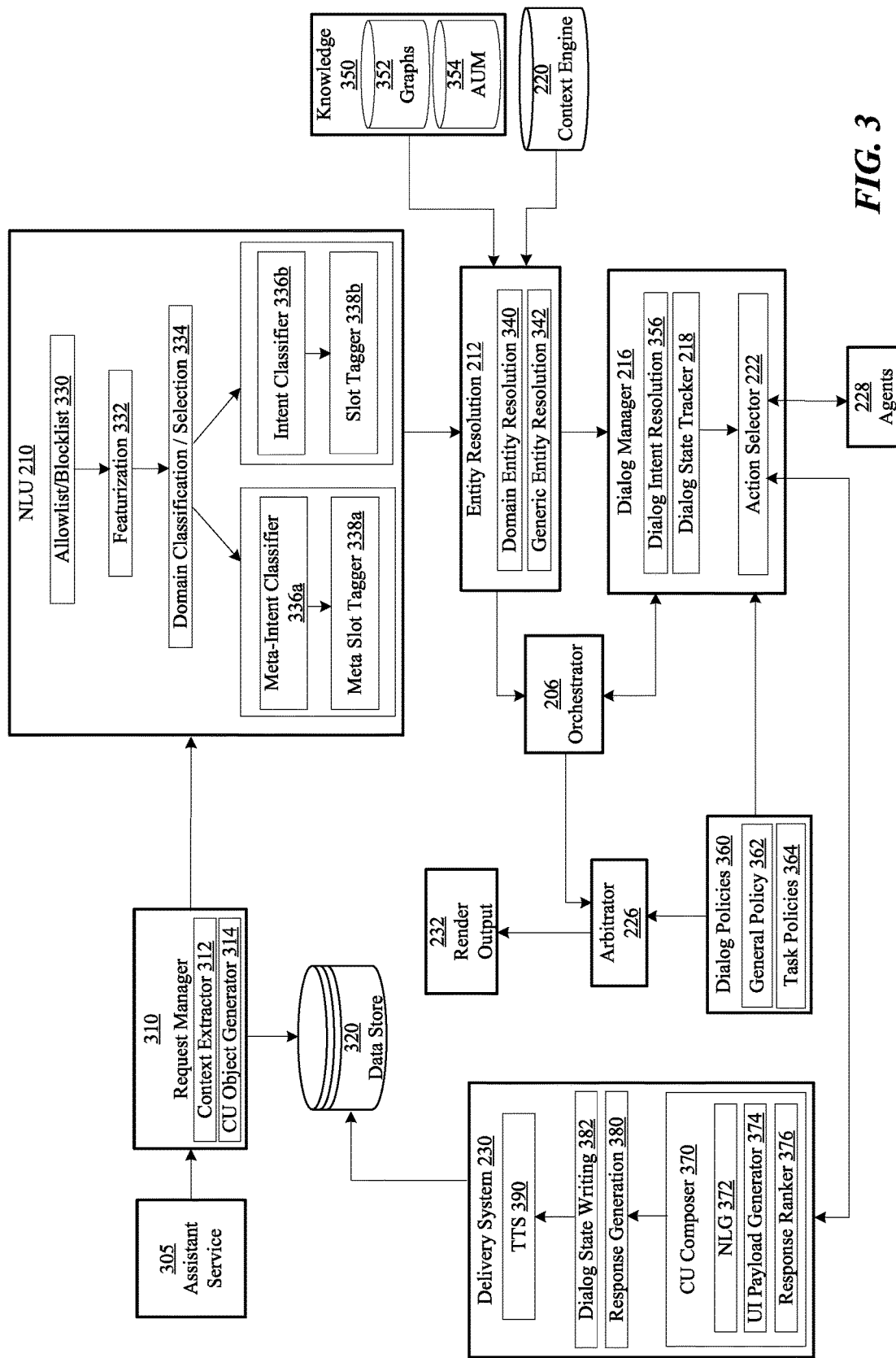
FIG. 3 illustrates an example flow diagram of the assistant system.

FIG. 3 illustrates an example flow diagram 300 of the assistant system 140. In particular embodiments, an assistant service module 305 may access a request manager 310 upon receiving a user input. In particular embodiments, the request manager 310 may comprise a context extractor 312 and a conversational understanding object generator (CU object generator) 314. The context extractor 312 may extract contextual information associated with the user input. The context extractor 312 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 314 may generate particular CU objects relevant to the user input. The CU objects may comprise dialog-session data and features associated with the user input, which may be shared with all the modules of the assistant system 140. In particular embodiments, the request manager 310 may store the contextual information and the generated CU objects in a data store 320 which is a particular data store implemented in the assistant system 140.

In particular embodiments, the request manger 310 may send the generated CU objects to the NLU module 210. The NLU module 210 may perform a plurality of steps to process the CU objects. The NLU module 210 may first run the CU objects through an allowlist/blocklist 330. In particular embodiments, the allowlist/blocklist 330 may comprise interpretation data matching the user input. The NLU module 210 may then perform a featurization 332 of the CU objects. The NLU module 210 may then perform domain classification/selection 334 on user input based on the features resulted from the featurization 332 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 210 may process the domain classification/selection results using a meta-intent classifier 336a. The meta-intent classifier 336a may determine categories that describe the user's intent. An intent may be an element in a pre-defined taxonomy of semantic intentions, which may indicate a purpose of a user interaction with the assistant system 140. The NLU module 210a may classify a user input into a member of the pre-defined taxonomy. For example, the user input may be "Play Beethoven's 5th," and the NLU module 210a may classify the input as having the intent [IN:play_music]. In particular embodiments, intents that are common to multiple domains may be processed by the meta-intent classifier 336a. As an example and not by way of limitation, the meta-intent classifier 336a may be based on a machine-learning model that may take the domain classification/selection results as input and calculate a probability of the input being associated with a particular predefined meta-intent. The NLU module 210 may then use a meta slot tagger 338a to annotate one or more meta slots for the classification result from the meta-intent classifier 336a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot maybe [SL:song_name]. In particular embodiments, the meta slot tagger 338a may tag generic slots such as references to items (e.g., the first), the type of slot, the value of the slot, etc. In particular embodiments, the NLU module 210 may process the domain classification/selection results using an intent classifier 336b. The intent classifier 336b may determine the user's intent associated with the user input. In particular embodiments, there may be one intent classifier 336b for each domain to determine the most possible intents in a given domain. As an example and not by way of limitation, the intent classifier 336b may be based on a machine-learning model that may take the domain classification/selection results as input and calculate a probability of the input being associated with a particular predefined intent. The NLU module 210 may then use a slot tagger 338b to annotate one or more slots associated with the user input. In particular embodiments, the slot tagger 338b may annotate the one or more slots for the n-grams of the user input. As an example and not by way of limitation, a user input may comprise "change 500 dollars in my account to Japanese yen." The intent classifier 336b may take the user input as input and formulate it into a vector. The intent classifier 336b may then calculate probabilities of the user input being associated with different predefined intents based on a vector comparison between the vector representing the user input and the vectors representing different predefined intents. In a similar manner, the slot tagger 338b may take the user input as input and formulate each word into a vector. The slot tagger 338b may then calculate probabilities of each word being associated with different predefined slots based on a vector comparison between the vector representing the word and the vectors representing different predefined slots. The intent of the user may be classified as "changing money". The slots of the user input may comprise "500", "dollars", "account", and "Japanese yen". The meta-intent of the user may be classified as "financial service". The meta slot may comprise "finance".

In particular embodiments, the natural-language understanding (NLU) module 210 may additionally extract information from one or more of a social graph, a knowledge graph, or a concept graph, and may retrieve a user's profile stored locally on the client system 130. The NLU module 210 may additionally consider contextual information when analyzing the user input. The NLU module 210 may further process information from these different sources by identifying and aggregating information, annotating n-grams of the user input, ranking the n-grams with confidence scores based on the aggregated information, and formulating the ranked n-grams into features that may be used by the NLU module 210 for understanding the user input. In particular embodiments, the NLU module 210 may identify one or more of a domain, an intent, or a slot from the user input in a personalized and context-aware manner. As an example and not by way of limitation, a user input may comprise "show me how to get to the coffee shop." The NLU module 210 may identify a particular coffee shop that the user wants to go to based on the user's personal information and the associated contextual information. In particular embodiments, the NLU module 210 may comprise a lexicon of a particular language, a parser, and grammar rules to partition sentences into an internal representation. The NLU module 210 may also comprise one or more programs that perform naive semantics or stochastic semantic analysis, and may further use pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to the entity resolution module 212 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity resolution module 212 may comprise domain entity resolution 340 and generic entity resolution 342. The entity resolution module 212 may execute generic and domain-specific entity resolution. The generic entity resolution 342 may resolve the entities by categorizing the slots and meta slots into different generic topics. The domain entity resolution 340 may resolve the entities by categorizing the slots and meta slots into different domains. As an example and not by way of limitation, in response to the input of an inquiry of the advantages of a particular brand of electric car, the generic entity resolution 342 may resolve the referenced brand of electric car as vehicle and the domain entity resolution 340 may resolve the referenced brand of electric car as electric car.

In particular embodiments, entities may be resolved based on knowledge 350 about the world and the user. The assistant system 140 may extract ontology data from the graphs 352. As an example and not by way of limitation, the graphs 352 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to similarities and differences. For example, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability and/or a semantic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fantasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 354 may comprise user episodic memories which help determine how to assist a user more effectively. The AUM 354 may be the central place for storing, retrieving, indexing, and searching over user data. As an example and not by way of limitation, the AUM 354 may store information such as contacts, photos, reminders, etc. Additionally, the AUM 354 may automatically synchronize data to the server and other devices (only for non-sensitive data). As an example and not by way of limitation, if the user sets a nickname for a contact on one device, all devices may synchronize and get that nickname based on the AUM 354. In particular embodiments, the AUM 354 may first prepare events, user state, reminder, and trigger state for storing in a data store. Memory node identifiers (ID) may be created to store entry objects in the AUM 354, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 354 may then index these data for retrieval as needed. Index ID may be created for such purpose. In particular embodiments, given an "index key" (e.g., PHOTO_LOCATION) and "index value" (e.g., "San Francisco"), the AUM 354 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 354 may further conduct information retrieval with a flexible query language. Relation index ID may be created for such purpose. In particular embodiments, given a source memory node and an edge type, the AUM 354 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 354 may help detect concurrent updates of different events. More information on episodic memories may be found in U.S. patent application Ser. No. 16/552,559, filed 27 Aug. 2019, which is incorporated by reference.

In particular embodiments, the entity resolution module 212 may use different techniques to resolve different types of entities. For real-world entities, the entity resolution module 212 may use a knowledge graph to resolve the span to the entities, such as "music track", "movie", etc. For user entities, the entity resolution module 212 may use user memory or some agents to resolve the span to user-specific entities, such as "contact", "reminders", or "relationship". For contextual entities, the entity resolution module 212 may perform coreference based on information from the context engine 220 to resolve the references to entities in the context, such as "him", "her", "the first one", or "the last one". In particular embodiments, for coreference, the entity resolution module 212 may create references for entities determined by the NLU module 210. The entity resolution module 212 may then resolve these references accurately. As an example and not by way of limitation, a user input may comprise "find me the nearest grocery store and direct me there". Based on coreference, the entity resolution module 212 may interpret "there" as "the nearest grocery store". In particular embodiments, coreference may depend on the information from the context engine 220 and the dialog manager 216 so as to interpret references with improved accuracy. In particular embodiments, the entity resolution module 212 may additionally resolve an entity under the context (device context or dialog context), such as, for example, the entity shown on the screen or an entity from the last conversation history. For value resolutions, the entity resolution module 212 may resolve the mention to exact value in standardized form, such as numerical value, date time, address, etc.

In particular embodiments, the entity resolution module 212 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 212 may refrain from returning that user's entity identifier in response to a user input. By utilizing the described information obtained from the social graph, the knowledge graph, the concept graph, and the user profile, and by complying with any applicable privacy policies, the entity resolution module 212 may resolve entities associated with a user input in a personalized, context-aware, and privacy-protected manner.

In particular embodiments, the entity resolution module 212 may work with the ASR module 208 to perform entity resolution. The following example illustrates how the entity resolution module 212 may resolve an entity name. The entity resolution module 212 may first expand names associated with a user into their respective normalized text forms as phonetic consonant representations which may be phonetically transcribed using a double metaphone algorithm. The entity resolution module 212 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 212 may identify various possible text transcriptions associated with each slot, correlated by boundary timing offsets associated with the slot's transcription. The entity resolution module 212 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 212 by providing it with the scored lists of phrases associated with one of its slots and the categories against which it should be resolved. As an example and not by way of limitation, if an entity attribute is specified as "friend," the entity resolution module 212 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 212 may perform parallel searches against the knowledge graph for each candidate set of terms for the slot output from the ASR module 208. The entity resolution module 212 may score matches based on matched person popularity and ASR-provided score signal. In particular embodiments, when the memory category is specified, the entity resolution module 212 may perform the same search against user memory. The entity resolution module 212 may crawl backward through user memory and attempt to match each memory (e.g., person recently mentioned in conversation, or seen and recognized via visual signals, etc.). For each entity, the entity resolution module 212 may employ matching similarly to how friends are matched (i.e., phonetic). In particular embodiments, scoring may comprise a temporal decay factor associated with a recency with which the name was previously mentioned. The entity resolution module 212 may further combine, sort, and dedupe all matches. In particular embodiments, the task may receive the set of candidates. When multiple high scoring candidates are present, the entity resolution module 212 may perform user-facilitated disambiguation (e.g., getting real-time user feedback from users on these candidates).

In particular embodiments, the context engine 220 may help the entity resolution module 212 improve entity resolution. The context engine 220 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the context engine 220 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 220 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 212 may process the information from the context engine 220 (e.g., a user profile) in the following steps based on natural-language processing (NLP). In particular embodiments, the entity resolution module 212 may tokenize text by text normalization, extract syntax features from text, and extract semantic features from text based on NLP. The entity resolution module 212 may additionally extract features from contextual information, which is accessed from dialog history between a user and the assistant system 140. The entity resolution module 212 may further conduct global word embedding, domain-specific embedding, and/or dynamic embedding based on the contextual information. The processing result may be annotated with entities by an entity tagger. Based on the annotations, the entity resolution module 212 may generate dictionaries. In particular embodiments, the dictionaries may comprise global dictionary features which can be updated dynamically offline. The entity resolution module 212 may rank the entities tagged by the entity tagger. In particular embodiments, the entity resolution module 212 may communicate with different graphs 352 including one or more of the social graph, the knowledge graph, or the concept graph to extract ontology data that is relevant to the retrieved information from the context engine 220. In particular embodiments, the entity resolution module 212 may further resolve entities based on the user profile, the ranked entities, and the information from the graphs 352.

In particular embodiments, the entity resolution module 212 may be driven by the task (corresponding to an agent 228). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 212 may resolve "John" against everything. As another example and not by way of limitation, for the utterance "send a message to John", the entity resolution module 212 may easily determine "John" refers to a person that one can message. As a result, the entity resolution module 212 may bias the resolution to a friend. As another example and not by way of limitation, for the utterance "what is John's most famous album?" To resolve "John", the entity resolution module 212 may first determine the task corresponding to the utterance, which is finding a music album. The entity resolution module 212 may determine that entities related to music albums include singers, producers, and recording studios. Therefore, the entity resolution module 212 may search among these types of entities in a music domain to resolve "John."

In particular embodiments, the output of the entity resolution module 212 may be sent to the dialog manager 216 to advance the flow of the conversation with the user. The dialog manager 216 may be an asynchronous state machine that repeatedly updates the state and selects actions based on the new state. The dialog manager 216 may additionally store previous conversations between the user and the assistant system 140. In particular embodiments, the dialog manager 216 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 216 may implement reinforcement learning frameworks to improve the dialog optimization. The dialog manager 216 may comprise dialog intent resolution 356, the dialog state tracker 218, and the action selector 222. In particular embodiments, the dialog manager 216 may execute the selected actions and then call the dialog state tracker 218 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 356 may map intents determined by the NLU module 210 to different dialog intents. The dialog intent resolution 356 may further rank dialog intents based on signals from the NLU module 210, the entity resolution module 212, and dialog history between the user and the assistant system 140.

In particular embodiments, the dialog state tracker 218 may use a set of operators to track the dialog state. The operators may comprise necessary data and logic to update the dialog state. Each operator may act as delta of the dialog state after processing an incoming user input. In particular embodiments, the dialog state tracker 218 may a comprise a task tracker, which may be based on task specifications and different rules. The dialog state tracker 218 may also comprise a slot tracker and coreference component, which may be rule based and/or recency based. The coreference component may help the entity resolution module 212 to resolve entities. In alternative embodiments, with the coreference component, the dialog state tracker 218 may replace the entity resolution module 212 and may resolve any references/mentions and keep track of the state. In particular embodiments, the dialog state tracker 218 may convert the upstream results into candidate tasks using task specifications and resolve arguments with entity resolution. Both user state (e.g., user's current activity) and task state (e.g., triggering conditions) may be tracked. Given the current state, the dialog state tracker 218 may generate candidate tasks the assistant system 140 may process and perform for the user. As an example and not by way of limitation, candidate tasks may include "show suggestion," "get weather information," or "take photo." In particular embodiments, the dialog state tracker 218 may generate candidate tasks based on available data from, for example, a knowledge graph, a user memory, and a user task history. In particular embodiments, the dialog state tracker 218 may then resolve the triggers object using the resolved arguments. As an example and not by way of limitation, a user input "remind me to call mom when she's online and I'm home tonight" may perform the conversion from the NLU output to the triggers representation by the dialog state tracker 218 as illustrated in Table 1 below:

TABLE 1

Example Conversion from NLU Output to Triggers Representation

| NLU Ontology Representation: | Triggers Representation: |
|---|---|
| [IN:CREATE_SMART_REMINDER<br>Remind me to<br>  [SL:TODO call mom] when<br>  [SL:TRIGGER_CONJUNCTION<br>    [IN:GET_TRIGGER<br>      [SL:TRIGGER_SOCIAL_UPDATE<br>      she's online] and I'm<br>    [SL:TRIGGER_LOCATION home]] → | Triggers: {<br>  andTriggers: [<br>    condition: {ContextualEvent(mom is online)},<br>    condition: {ContextualEvent(location is home)},<br>    condition: {ContextualEvent(time is tonight)}])}} |

TABLE 1-continued

Example Conversion from NLU Output to Triggers Representation

| NLU Ontology Representation: | Triggers Representation: |
|---|---|
|     [SL:DATE_TIME tonight]<br>  ]<br> ]<br>] | |

In the above example, "mom," "home," and "tonight" are represented by their respective entities: personEntity, locationEntity, datetimeEntity.

In particular embodiments, the dialog manager 216 may map events determined by the context engine 220 to actions. As an example and not by way of limitation, an action may be a natural-language generation (NLG) action, a display or overlay, a device action, or a retrieval action. The dialog manager 216 may also perform context tracking and interaction management. Context tracking may comprise aggregating real-time stream of events into a unified user state. Interaction management may comprise selecting optimal action in each state. In particular embodiments, the dialog state tracker 218 may perform context tracking (i.e., tracking events related to the user). To support processing of event streams, the dialog state tracker 218a may use an event handler (e.g., for disambiguation, confirmation, request) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all event handlers may have an opportunity to process a given event. As an example and not by way of limitation, the dialog state tracker 218 may run all event handlers in parallel on every event, and then may merge the state updates proposed by each event handler (e.g., for each event, most handlers may return a NULL update).

In particular embodiments, the dialog state tracker 218 may work as any programmatic handler (logic) that requires versioning. In particular embodiments, instead of directly altering the dialog state, the dialog state tracker 218 may be a side-effect free component and generate n-best candidates of dialog state update operators that propose updates to the dialog state. The dialog state tracker 218 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 218 may update/rank the dialog state of the current dialog session. As an example and not by way of limitation, the dialog state tracker 218 may update the dialog state as "completed" if the dialog session is over. As another example and not by way of limitation, the dialog state tracker 218 may rank the dialog state based on a priority associated with it.

In particular embodiments, the dialog state tracker 218 may communicate with the action selector 222 about the dialog intents and associated content objects. In particular embodiments, the action selector 222 may rank different dialog hypotheses for different dialog intents. The action selector 222 may take candidate operators of dialog state and consult the dialog policies 360 to decide what actions should be executed. In particular embodiments, a dialog policy 360 may a tree-based policy, which is a pre-constructed dialog plan. Based on the current dialog state, a dialog policy 360 may choose a node to execute and generate the corresponding actions. As an example and not by way of limitation, the tree-based policy may comprise topic grouping nodes and dialog action (leaf) nodes. In particular embodiments, a dialog policy 360 may also comprise a data structure that describes an execution plan of an action by an agent 228. A dialog policy 360 may further comprise multiple goals related to each other through logical operators. In particular embodiments, a goal may be an outcome of a portion of the dialog policy and it may be constructed by the dialog manager 216. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, goals may be mapped to leaves of the tree of the tree-structured representation of the dialog policy 360.

In particular embodiments, the assistant system 140 may use hierarchical dialog policies 360 with general policy 362 handling the cross-domain business logic and task policies 364 handling the task/domain specific logic. The general policy 362 may be used for actions that are not specific to individual tasks. The general policy 362 may be used to determine task stacking and switching, proactive tasks, notifications, etc. The general policy 362 may comprise handling low-confidence intents, internal errors, unacceptable user response with retries, and/or skipping or inserting confirmation based on ASR or NLU confidence scores. The general policy 362 may also comprise the logic of ranking dialog state update candidates from the dialog state tracker 218 output and pick the one to update (such as picking the top ranked task intent). In particular embodiments, the assistant system 140 may have a particular interface for the general policy 362, which allows for consolidating scattered cross-domain policy/business-rules, especial those found in the dialog state tracker 218, into a function of the action selector 222. The interface for the general policy 362 may also allow for authoring of self-contained sub-policy units that may be tied to specific situations or clients (e.g., policy functions that may be easily switched on or off based on clients, situation). The interface for the general policy 362 may also allow for providing a layering of policies with back-off, i.e., multiple policy units, with highly specialized policy units that deal with specific situations being backed up by more general policies 362 that apply in wider circumstances. In this context the general policy 362 may alternatively comprise intent or task specific policy.

In particular embodiments, a task policy 364 may comprise the logic for action selector 222 based on the task and current state. The task policy 364 may be dynamic and ad-hoc. In particular embodiments, the types of task policies 364 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 364 with machine-learning models. In particular embodiments, the general policy 362 may pick one operator from the candidate operators to update the dialog state, followed by the selection of a user facing action by a task policy 364. Once a task is active in the dialog state, the corresponding task policy 364 may be consulted to select right actions.

In particular embodiments, the action selector 222 may select an action based on one or more of the event determined by the context engine 220, the dialog intent and state, the associated content objects, and the guidance from dialog policies 360. Each dialog policy 360 may be subscribed to specific conditions over the fields of the state. After an event is processed and the state is updated, the action selector 222 may run a fast search algorithm (e.g., similarly to the Boolean satisfiability) to identify which policies should be triggered based on the current state. In particular embodiments, if multiple policies are triggered, the action selector 222 may use a tie-breaking mechanism to pick a particular policy. Alternatively, the action selector 222 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 222 may take the dialog state update operators as part of the input to select the dialog action. The execution of the dialog action may generate a set of expectations to instruct the dialog state tracker 218 to handle future turns. In particular embodiments, an expectation may be used to provide context to the dialog state tracker 218 when handling the user input from next turn. As an example and not by way of limitation, slot request dialog action may have the expectation of proving a value for the requested slot. In particular embodiments, both the dialog state tracker 218 and the action selector 222 may not change the dialog state until the selected action is executed. This may allow the assistant system 140 to execute the dialog state tracker 218 and the action selector 222 for processing speculative ASR results and to do n-best ranking with dry runs.

In particular embodiments, the action selector 222 may call different agents 228 for task execution. Meanwhile, the dialog manager 216 may receive an instruction to update the dialog state. As an example and not by way of limitation, the update may comprise awaiting agents' 228 response. An agent 228 may select among registered content providers to complete the action. The data structure may be constructed by the dialog manager 216 based on an intent and one or more slots associated with the intent. In particular embodiments, the agents 228 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 228 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 216 may support multi-turn compositional resolution of slot mentions. For a compositional parse from the NLU module 210, the resolver may recursively resolve the nested slots. The dialog manager 216 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 362 may examine the resolution state and create corresponding dialog action for user clarification. In dialog state tracker 218, based on the user input and the last dialog action, the dialog manager 216 may update the nested slot. This capability may allow the assistant system 140 to interact with the user not only to collect missing slot values but also to reduce ambiguity of more complex/ambiguous utterances to complete the task. In particular embodiments, the dialog manager 216 may further support requesting missing slots in a nested intent and multi-intent user inputs (e.g., "take this photo and send it to Dad"). In particular embodiments, the dialog manager 216 may support machine-learning models for more robust dialog experience. As an example and not by way of limitation, the dialog state tracker 218 may use neural network based models (or any other suitable machine-learning models) to model belief over task hypotheses. As another example and not by way of limitation, for action selector 222, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 222 may be sent to the delivery system 230. The delivery system 230 may comprise a CU composer 370, a response generation component 380, a dialog state writing component 382, and a text-to-speech (TTS) component 390. Specifically, the output of the action selector 222 may be received at the CU composer 370. In particular embodiments, the output from the action selector 222 may be formulated as a <k,c,u,d> tuple, in which k indicates a knowledge source, c indicates a communicative goal, u indicates a user model, and d indicates a discourse model.

In particular embodiments, the CU composer 370 may generate a communication content for the user using a natural-language generation (NLG) component 372. In particular embodiments, the NLG component 372 may use different language models and/or language templates to generate natural-language outputs. The generation of natural-language outputs may be application specific. The generation of natural-language outputs may be also personalized for each user. In particular embodiments, the NLG component 372 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 372 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 372. The sentence planner may determine the organization of the communication content to make it human understandable. The surface realization component may determine specific words to use, the sequence of the sentences, and the style of the communication content.

In particular embodiments, the CU composer 370 may also determine a modality of the generated communication content using the UI payload generator 374. Since the generated communication content may be considered as a response to the user input, the CU composer 370 may additionally rank the generated communication content using a response ranker 376. As an example and not by way of limitation, the ranking may indicate the priority of the response. In particular embodiments, the CU composer 370 may comprise a natural-language synthesis (NLS) component that may be separate from the NLG component 372. The NLS component may specify attributes of the synthesized speech generated by the CU composer 370, including gender, volume, pace, style, or register, in order to customize the response for a particular user, task, or agent. The NLS component may tune language synthesis without engaging the implementation of associated tasks. In particular embodiments, the CU composer 370 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 230 may perform different tasks based on the output of the CU composer 370. These tasks may include writing (i.e., storing/updating) the dialog state into the data store 330 using the dialog state writing component 382 and generating responses using the response generation component 380. In particular embodiments, the output of the CU composer 370 may be additionally sent to the TTS component 390 if the determined modality of the communication content is audio. In particular embodiments, the output from the delivery system 230 comprising one or more of the generated responses, the communication content, or the speech generated by the TTS component 390 may be then sent back to the dialog manager 216.

In particular embodiments, the orchestrator 206 may determine, based on the output of the entity resolution module 212, whether to processing a user input on the client system 130 or on the server, or in the third operational mode (i.e., blended mode) using both. Besides determining how to process the user input, the orchestrator 206 may receive the results from the agents 228 and/or the results from the delivery system 230 provided by the dialog manager 216. The orchestrator 206 may then forward these results to the arbitrator 226. The arbitrator 226 may aggregate these results, analyze them, select the best result, and provide the selected result to the render output module 232. In particular embodiments, the arbitrator 226 may consult with dialog policies 360 to obtain the guidance when analyzing these results. In particular embodiments, the render output module 232 may generate a response that is suitable for the client system 130.

Figure 4:
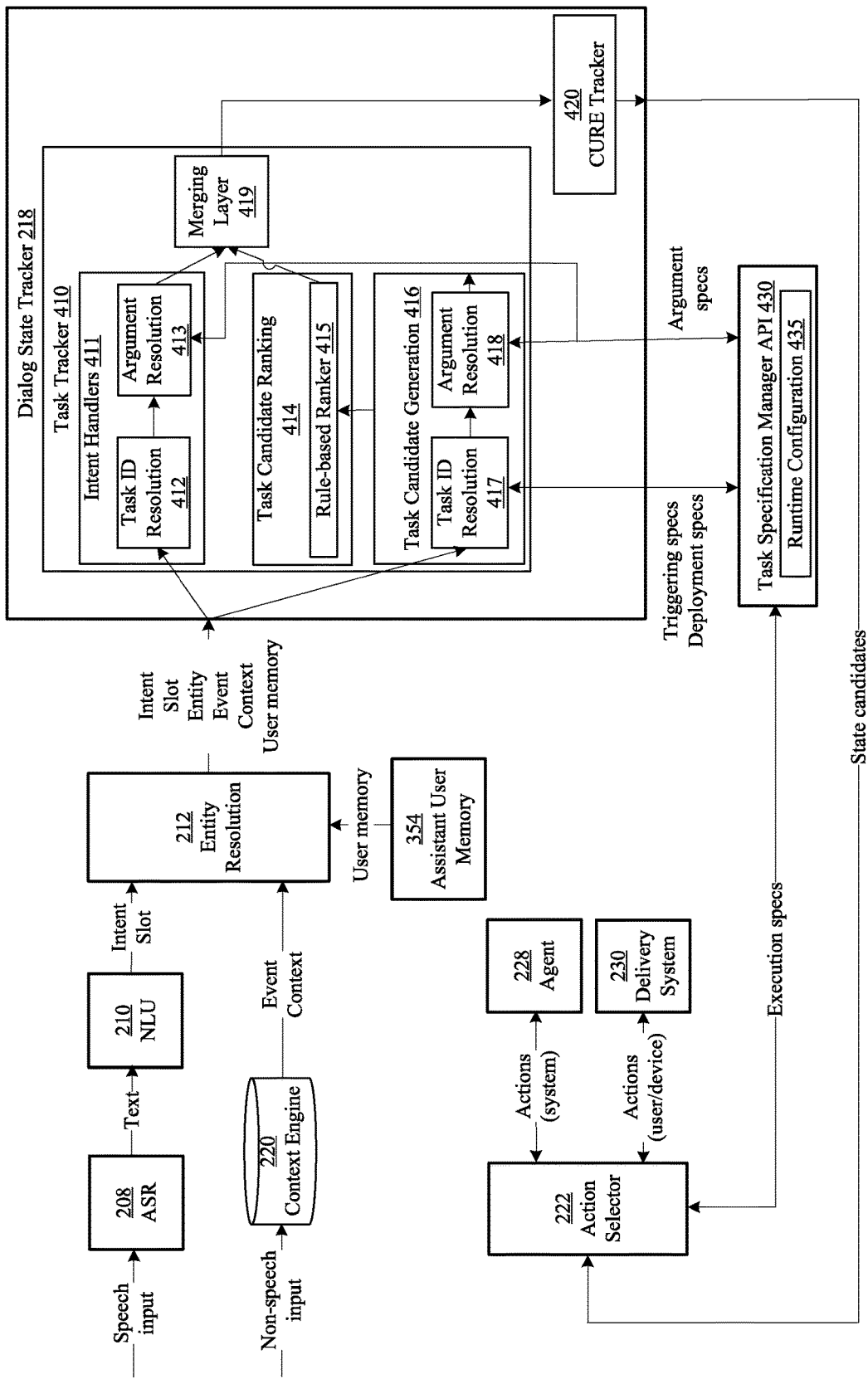
FIG. 4 illustrates an example task-centric flow diagram of processing a user input.

FIG. 4 illustrates an example task-centric flow diagram 400 of processing a user input. In particular embodiments, the assistant system 140 may assist users not only with voice-initiated experiences but also more proactive, multi-modal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 222 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 208 for extracting the text transcription from the speech input. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 220 for determining events and context from the non-speech input. The context engine 220 may determine multi-modal events comprising voice/text intents, location updates, visual events, touch, gaze, gestures, activities, device/application events, and/or any other suitable type of events. The voice/text intents may depend on the ASR module 208 and the NLU module 210. The location updates may be consumed by the dialog manager 216 to support various proactive/reactive scenarios. The visual events may be based on person or object appearing in the user's field of view. These events may be consumed by the dialog manager 216 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 222. For the device/application events, if an application makes an update to the device state, this may be published to the assistant system 140 so that the dialog manager 216 may use this context (what is currently displayed to the user) to handle reactive and proactive scenarios. As an example and not by way of limitation, the context engine 220 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, starting a call with touch, taking a photo with touch, opening an application, etc. In particular embodiments, the context engine 220 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 216 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 208 may be sent to the NLU module 210. The NLU module 210 may process the text transcription and extract the user intention (i.e., intents) and parse the slots or parsing result based on the linguistic ontology. In particular embodiments, the intents and slots from the NLU module 210 and/or the events and contexts from the context engine 220 may be sent to the entity resolution module 212. In particular embodiments, the entity resolution module 212 may resolve entities associated with the user input based on the output from the NLU module 210 and/or the context engine 220. The entity resolution module 212 may use different techniques to resolve the entities, including accessing user memory from the assistant user memory (AUM) 354. In particular embodiments, the AUM 354 may comprise user episodic memories helpful for resolving the entities by the entity resolution module 212. The AUM 354 may be the central place for storing, retrieving, indexing, and searching over user data.

In particular embodiments, the entity resolution module 212 may provide one or more of the intents, slots, entities, events, context, or user memory to the dialog state tracker 218. The dialog state tracker 218 may identify a set of state candidates for a task accordingly, conduct interaction with the user to collect necessary information to fill the state, and call the action selector 222 to fulfill the task. In particular embodiments, the dialog state tracker 218 may comprise a task tracker 410. The task tracker 410 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 208, the NLU module 210, etc.

In particular embodiments, the task tracker 410 may comprise intent handlers 411, task candidate ranking module 414, task candidate generation module 416, and merging layer 419. In particular embodiments, a task may be identified by its ID name. The task ID may be used to associate corresponding component assets if it is not explicitly set in the task specification, such as dialog policy 360, agent execution, NLG dialog act, etc. Therefore, the output from the entity resolution module 212 may be received by a task ID resolution component 417 of the task candidate generation module 416 to resolve the task ID of the corresponding task. In particular embodiments, the task ID resolution component 417 may call a task specification manager API 430 to access the triggering specifications and deployment specifications for resolving the task ID. Given these specifications, the task ID resolution component 417 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 228) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 216 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 430 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 430. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 435. The runtime stack may load all the task specifications from the runtime configurations 435 during the building time. In particular embodiments, in the runtime configurations 435, for a domain, there may be a cconf file and a cinc file (e.g., sidechef_task.cconf and sidechef_task.inc). As an example and not by way of limitation, <domain>_tasks.cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 418 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 416 may look for the list of tasks to be triggered as task candidates based on the resolved task ID and arguments.

In particular embodiments, the generated task candidates may be sent to the task candidate ranking module 414 to be further ranked. The task candidate ranking module 414 may use a rule-based ranker 415 to rank them. In particular embodiments, the rule-based ranker 415 may comprise a set of heuristics to bias certain domain tasks. The ranking logic may be described as below with principles of context priority. In particular embodiments, the priority of a user specified task may be higher than an on-foreground task.

The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 414 may customize some more logic to check the match of intent/slot/entity types. The ranked task candidates may be sent to the merging layer 419.

In particular embodiments, the output from the entity resolution module 212 may also sent to a task ID resolution component 412 of the intent handlers 411. The task ID resolution component 412 may resolve the task ID of the corresponding task similarly to the task ID resolution component 417. In particular embodiments, the intent handlers 411 may additionally comprise an argument resolution component 413. The argument resolution component 413 may resolve the argument names using the argument specifications for the resolved task ID similarly to the argument resolution component 418. In particular embodiments, intent handlers 411 may deal with task agnostic features and may not be expressed within the task specifications which are task specific. Intent handlers 411 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY_MEDIA], etc.). Intent handlers 411 may be also suitable for such type of tasks. In particular embodiments, the results from the intent handlers 411 may take precedence over the results from the task candidate ranking module 414. The results from the intent handlers 411 may be also sent to the merging layer 419.

In particular embodiments, the merging layer 419 may combine the results from the intent handlers 411 and the results from the task candidate ranking module 414. The dialog state tracker 218 may suggest each task as a new state for the dialog policies 360 to select from, thereby generating a list of state candidates. The merged results may be further sent to a conversational understanding reinforcement engine (CURE) tracker 420. In particular embodiments, the CURE tracker 420 may be a personalized learning process to improve the determination of the state candidates by the dialog state tracker 218 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 420 may be sent to the action selector 222. The action selector 222 may consult with the task policies 364, which may be generated from execution specifications accessed via the task specification manager API 430. In particular embodiments, the execution specifications may describe how a task should be executed and what actions the action selector 222 may need to take to complete the task.

In particular embodiments, the action selector 222 may determine actions associated with the system. Such actions may involve the agents 228 to execute. As a result, the action selector 222 may send the system actions to the agents 228 and the agents 228 may return the execution results of these actions. In particular embodiments, the action selector may determine actions associated with the user or device. Such actions may need to be executed by the delivery system 230. As a result, the action selector 222 may send the user/device actions to the delivery system 230 and the delivery system 230 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Virtual-Reality Systems

Figure 5:
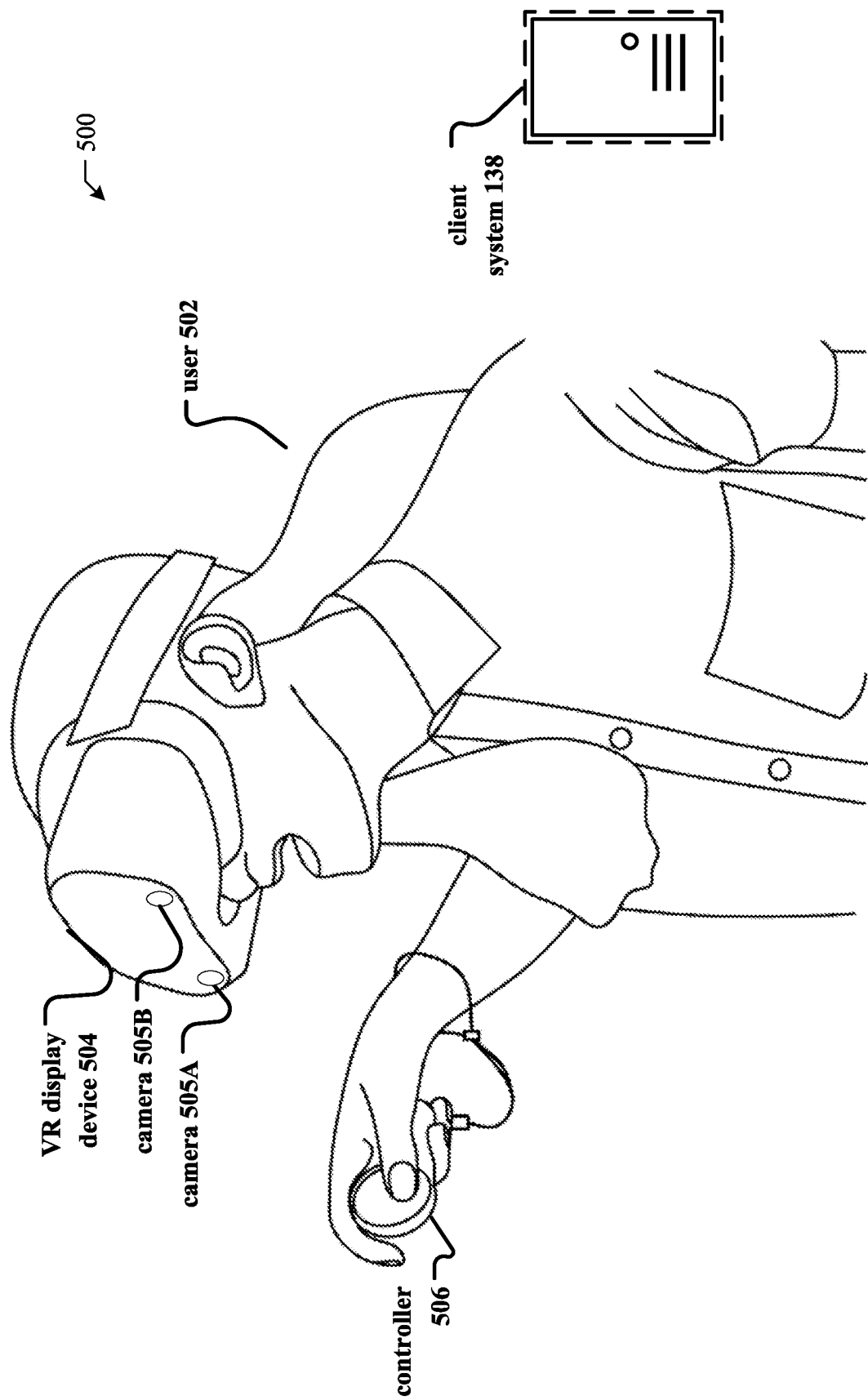
FIG. 5 illustrates an example of a virtual reality (VR) system worn by a user.

FIG. 5 illustrates an example of a virtual reality (VR) system 500 worn by a user 502. In particular embodiments, the VR system 500 may comprise a head-mounted VR display device 504, a controller 506, and one or more client systems 138. The VR display device 504 may be worn over the user's eyes and provide visual content to the user 502 through internal displays (not shown). The VR display device 504 may have two separate internal displays, one for each eye of the user 502 (single display devices are also possible). In particular embodiments, the VR display device 504 may comprise one or more external-facing cameras, such as the two forward-facing cameras 505A and 505B, which can capture images and videos of the real-world environment. The VR system 500 may further include one or more client systems 138. The one or more client systems 138 may be a stand-alone unit that is physically separate from the VR display device 504 or the client systems 138 may be integrated with the VR display device 504. In embodiments where the one or more client systems 138 are a separate unit, the one or more client systems 138 may be communicatively coupled to the VR display device 504 via a wireless or wired link. The one or more client systems 138 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a VR system 500 depends on the capabilities of its one or more client systems 138.

Augmented-Reality Systems

Figure 6:
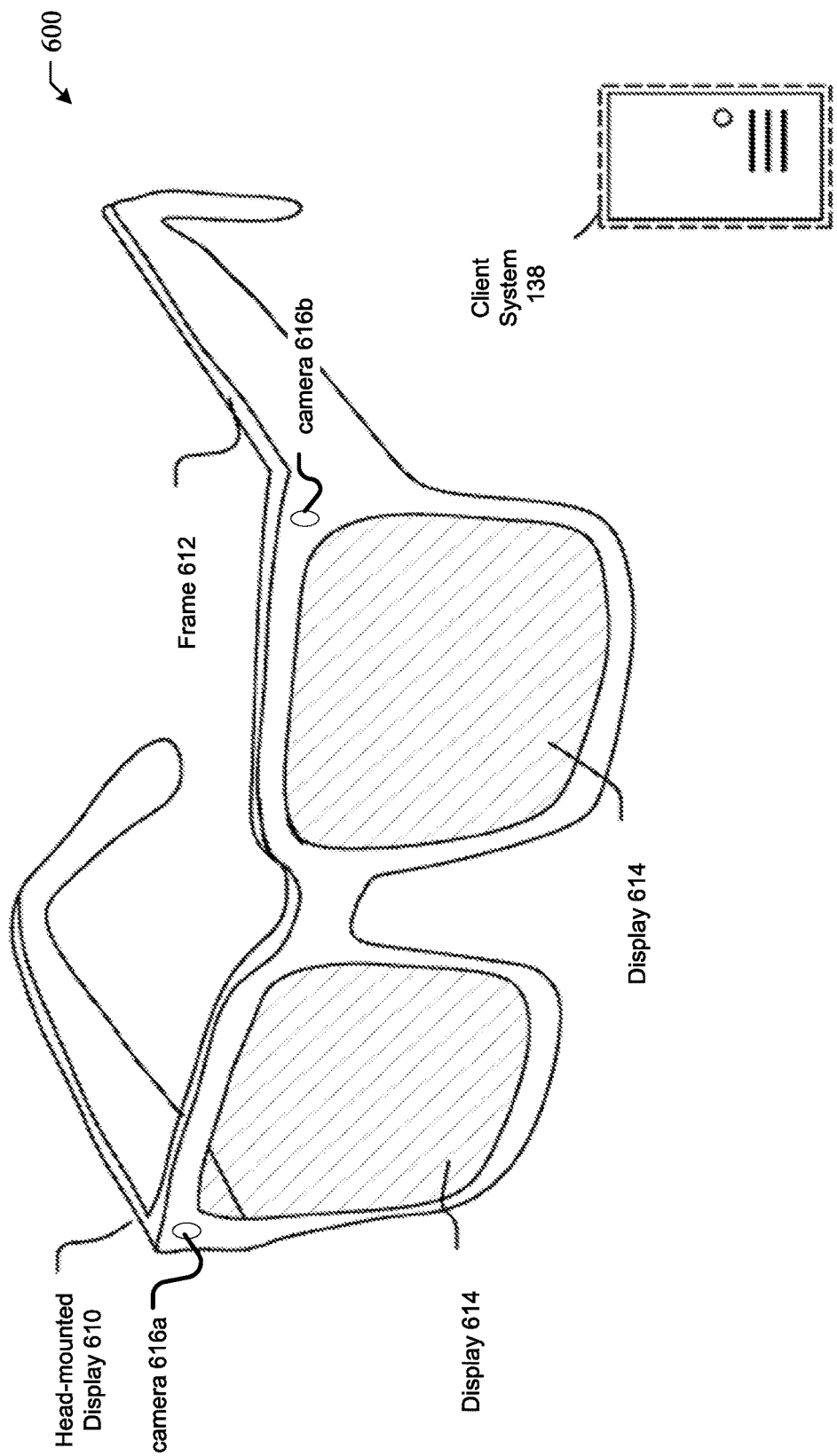
FIG. 6 illustrates an example augmented-reality system.

FIG. 6 illustrates an example augmented-reality system 600. In particular embodiments, the augmented-reality system 600 can perform one or more processes as described herein. The augmented-reality system 600 may include a head-mounted display (HMD) 610 (e.g., glasses) comprising a frame 612, one or more displays 614, one or more external-facing cameras such as the two forward-facing cameras 616a and 616b, and a client system 138. The external-facing cameras can capture images and videos of the real-world environment. The displays 614 may be transparent or translucent allowing a user wearing the HMD 610 to look through the displays 614 to see the real world and displaying visual artificial reality content to the user at the same time. The HMD 610 may include an audio device that may provide audio artificial reality content to users. The HMD 610 may include one or more cameras which can capture images and videos of environments. The HMD 610 may include an eye tracking system to track the vergence movement of the user wearing the HMD 610. The HMD 610 may include a microphone to capture voice input from the user. The augmented-reality system 600 may further include a controller comprising a trackpad and one or more buttons. The controller may receive inputs from users and relay the inputs to the client system 138. The controller may also provide haptic feedback to users. The client system 138 may be connected to the HMD 610 and the controller through cables or wireless connections. The client system 138 may control the HMD 610 and the controller to provide the augmented-reality content to and receive inputs from users. The client system 138 may be a standalone host computer device, an on-board computer device integrated with the HMD 610, a mobile device, or any other hardware platform capable of providing augmented-reality content to and receiving inputs from users.

Object tracking within the image domain is a known technique. For example, a stationary camera may capture a video of a moving object, and a computing system may compute, for each frame, the 3D position of an object of interest or one of its observable features relative to the camera. When the camera is stationary, any change in the object's position is attributable only to the object's movement and/or jitter caused by the tracking algorithm. In this case, the motion of the tracked object could be temporally smoothed by simply applying a suitable averaging algorithm (e.g., averaging with an exponential temporal decay) to the current estimated position of the object and the previously estimated position(s) of the object.

Motion smoothing becomes much more complex in the context of augmented reality. For augmented-reality systems, an external-facing camera is often mounted on the HMD and, therefore, could be capturing a video of another moving object while moving with the user's head. When using such a non-stationary camera to track a moving object, the tracked positional changes of the object could be due to not only the object's movements but also the camera's movements. Therefore, the aforementioned method for temporally smoothing the tracked positions of the object would no longer work.

Dynamically Morphing Virtual Assistant Avatars

In particular embodiments, the AR/VR system 130 may customize/morph an AR/VR virtual assistant avatar (hereinafter an "XR assistant avatar") as it follows around a user crossing different spaces, environments, applications, or surfaces. As an example and not by way of limitation, the customization may include changing the look and feel, voice, emotions, or other attributes. The customization of the XR assistant avatar may be triggered by the system responsive to different informative cues. As an example and not by way of limitation, such informative cues may include changes in application/game state, changes in the real-world or virtual environment, or the user's actions or context. The customization may also include rendering the XR assistant avatar in an animated/realistic way, e.g., humanlike. Thus, the XR assistant avatar may have motion and audio cues that are more animated and/or realistic to convey responses and emotions better to the user. In particular embodiments, the assistant system 140 may provide a way for the user to interact via the XR assistant avatar in a conversation manner (i.e., natural-language dialog), where the natural-language responses provided by the XR assistant avatar may customize to the specific application the user is engaging with. Although this disclosure describes customizing particular avatars by particular systems (e.g., the AR/VR system 130) in a particular manner, this disclosure contemplates customizing any suitable avatar by any suitable system (e.g., the assistant system 140) in any suitable manner.

In particular embodiments, the AR/VR system 130 may render, for one or more displays of an extended-reality (XR) display device, a first output image of an XR assistant avatar within an environment in a field of view (FOV) of a first user of the XR display device. The XR assistant avatar may have a first form and a first pose with respect to the first user. The XR assistant avatar may be interactable by the first user to access an assistant system 140. In particular embodiments, the AR/VR system 130 may detect a change in a context of the first user with respect to the environment. The AR/VR system 130 may then determine whether to morph the XR assistant avatar based on the detected change in the context of the first user. In particular embodiments, the AR/VR system 130 may further render, for the one or more displays of the XR display device, a second output image of the XR assistant avatar. The XR assistant avatar may be morphed to have a second form and a second pose with respect to the first user responsive to determining to morph the XR assistant avatar based on the detected change in the context of the first user.

In particular embodiments, the one or more computing systems may comprise the XR display device. This may indicate morphing the XR assistant avatar is performed by the AR/VR system 130. In alternative embodiments, the one or more computing systems may comprise the assistant system 140. Correspondingly, the morphing of the XR assistant avatar may be performed by the assistant system 140.

In particular embodiments, the environment may be a real-world environment. Accordingly, the XR assistant avatar may be an augmented-reality (AR) rendering. As an example and not by way of limitation, the AR rendering of the XR assistant may be positioned in a couch of a user's living room in the real world. In particular embodiments, the environment may be a virtual-reality (VR) environment. Accordingly, the XR assistant avatar may be a VR rendering. As an example and not by way of limitation, a user may be wearing a VR headset experiencing the VR world and the XR assistant avatar may be rendered in the VR world accompanying the user.

Figure 7A:
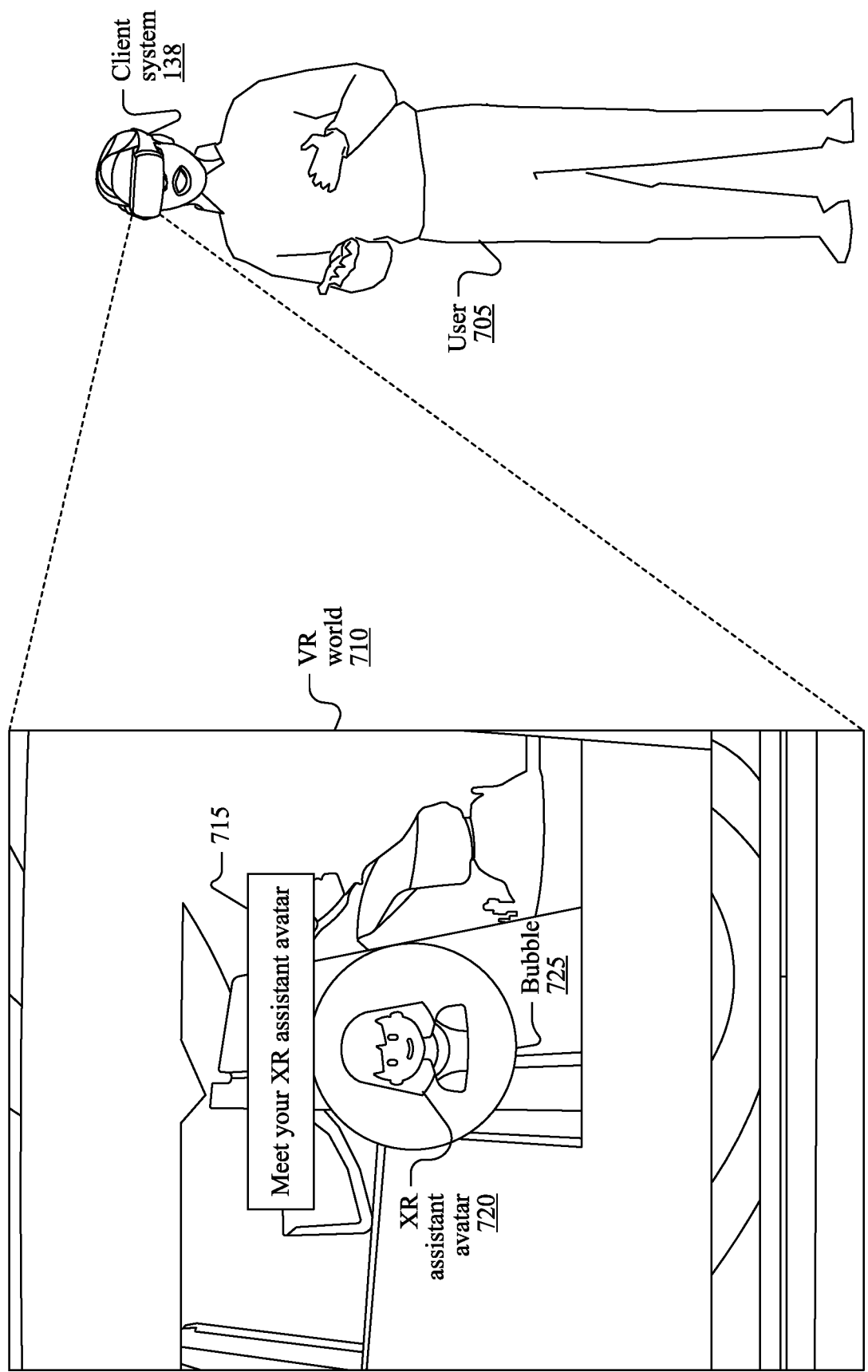
FIGS. 7A-7C illustrates an example rendering of the XR assistant avatar.
Figure 7B:
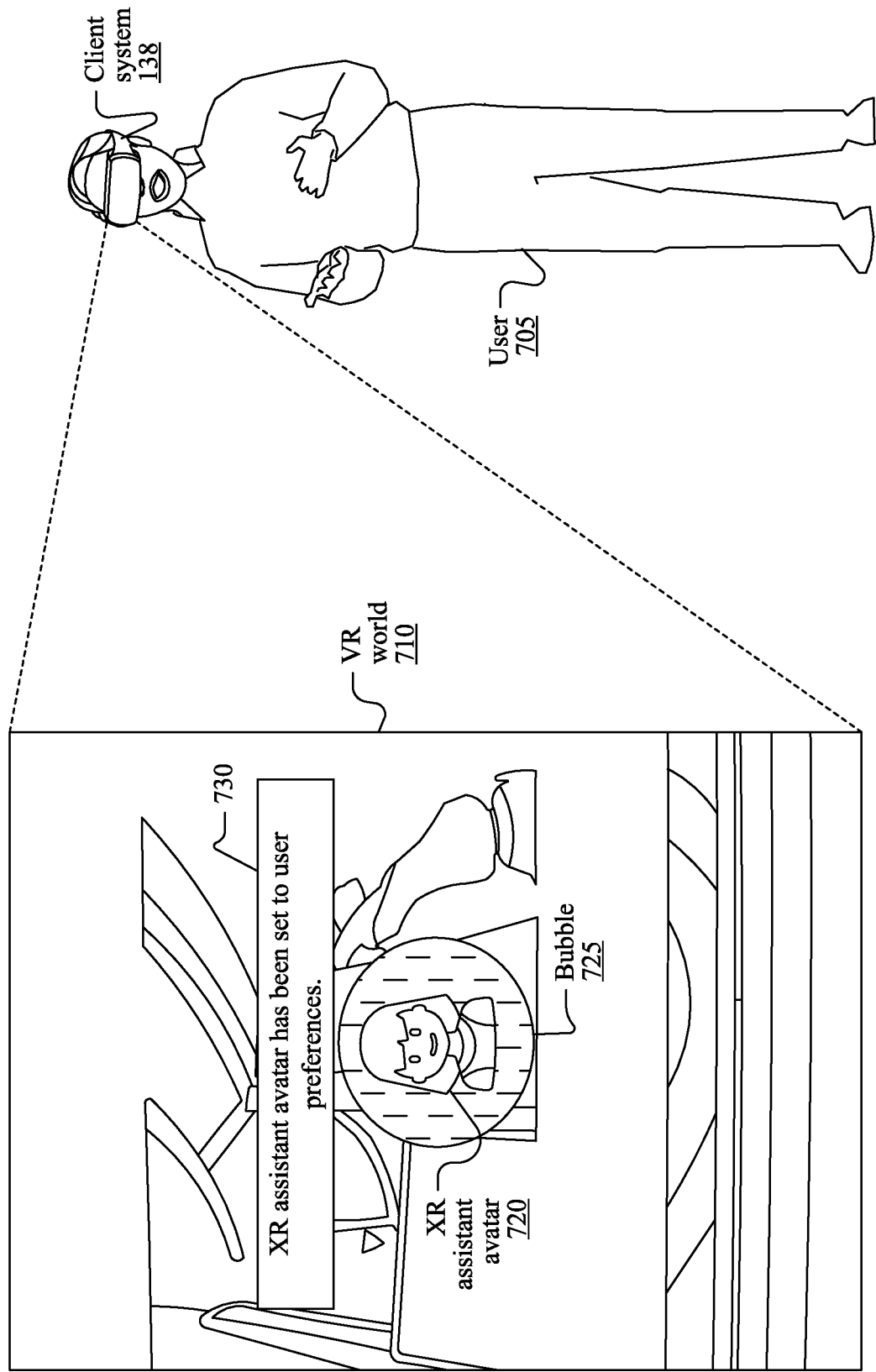
Figure 7C:
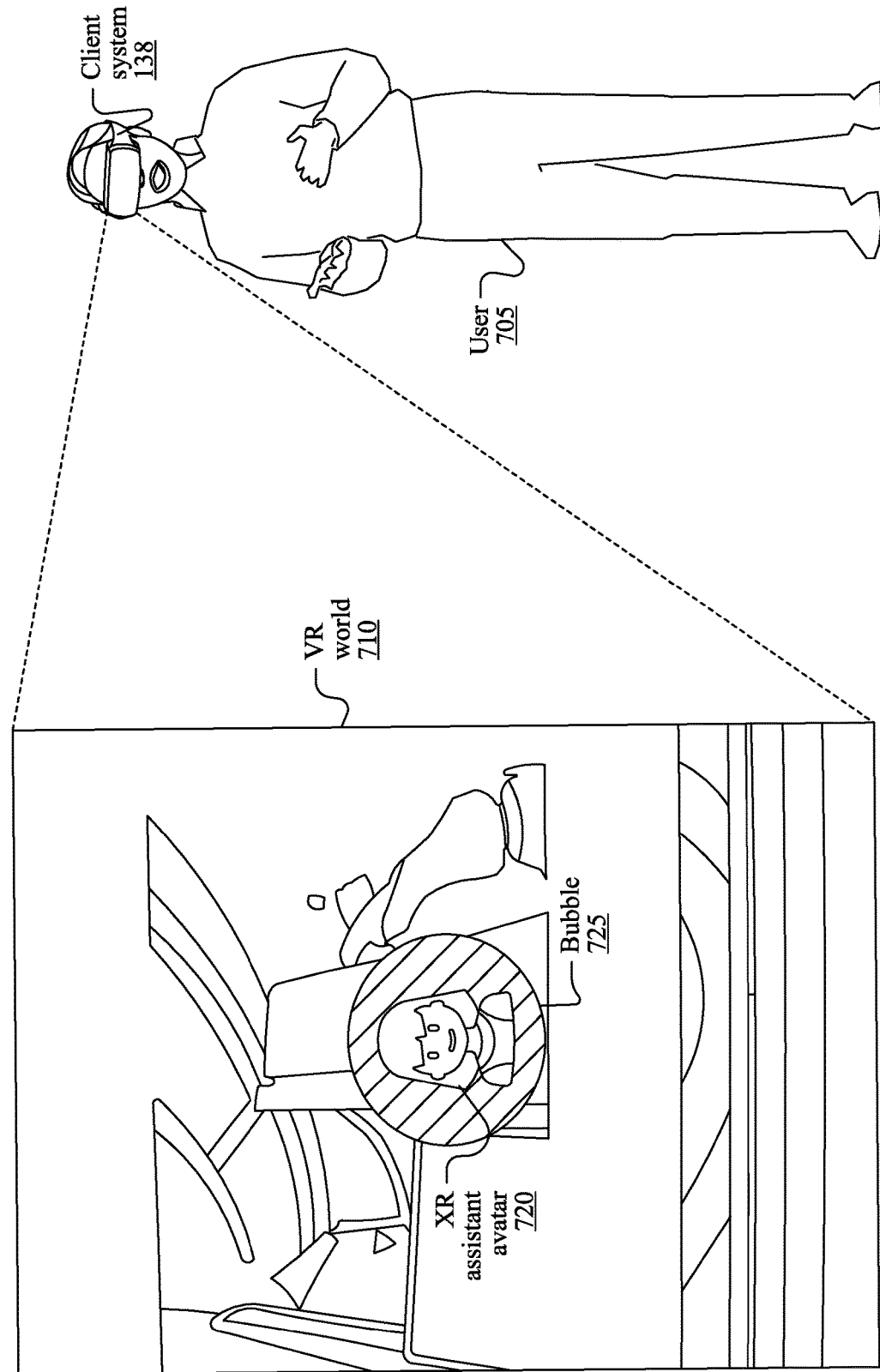

FIGS. 7A-7C illustrates an example rendering of the XR assistant avatar. In FIG. 7A, when a user 705 wearing a VR headset as the client system 138 starts the VR world 710, the AR/VR system 130 may introduce the user's 705 personal assistant to them. For example, there may be a welcoming message "meet your XR assistant avatar 715" and the XR assistant avatar 720 may be rendered inside a bubble 725. FIG. 7B illustrates that the XR assistant avatar 720 is speaking to the user 705 after the user 705 set the user preferences. For example, the XR assistant avatar 720 may say "XR assistant avatar has been set to user preferences. 730" In particular embodiments, the bubble 725 may be rendered in a particular color/pattern when the XR assistant avatar 720 is speaking to the user 705. FIG. 7C illustrates that the XR assistant avatar 720 is listening to the user 705. In particular embodiments, the bubble 725 may be rendered in another color/pattern when the XR assistant avatar 720 is listening to the user 705.

In particular embodiments, morphing the XR assistant avatar may indicate an instantaneous change. The morphing may also indicate step changes of the XR assistant avatar. As an example and not by way of limitation, when a user goes from home to a tennis game, the XR assistant avatar may first change its clothes, then 0.2 sec later it may change its shoes, then 0.2 sec later it may change its hair, and so on with one feature at a time changing every fraction of a second until all changes are done. In alternative embodiments, morphing may indicate smooth transformations between different forms and/or poses of the XR assistant avatar.

Figure 8:
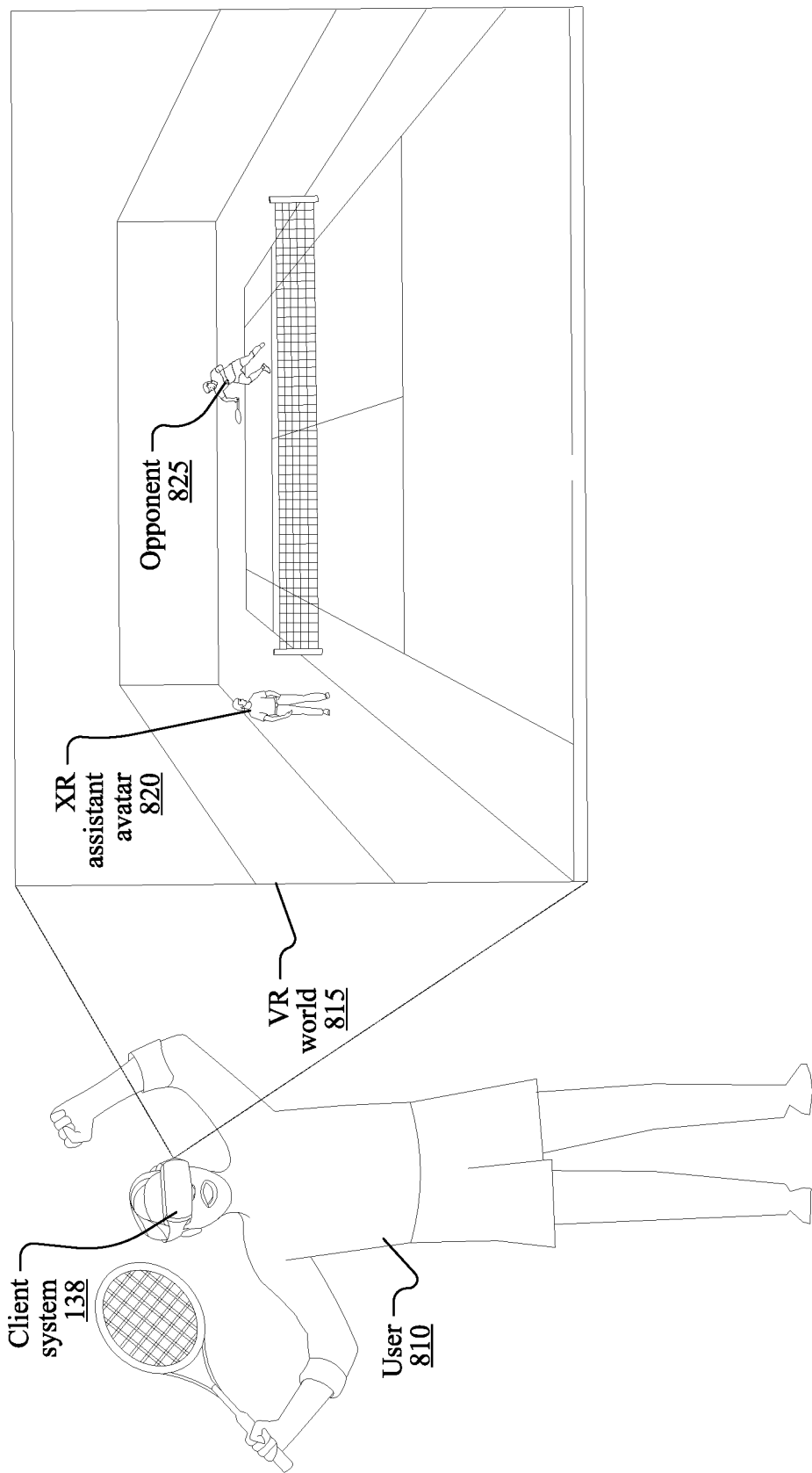
FIG. 8 illustrates an example rendering of the XR assistant avatar for a tennis game.

In particular embodiments, the XR assistant avatar may customize/morph as it follows a user around. At a high level, the customization may be as follows. The XR assistant avatar may change its look and feel as the user moves to different spaces or surfaces. As an example and not by way of limitation, if the user enters into a tennis game, the XR assistant avatar may morph into wearing a tennis outfit. FIG. 8 illustrates an example rendering of the XR assistant avatar for a tennis game. A user 810 may be wearing a VR headset as the client system 138 and playing a VR tennis game in the VR world 815. The user 810 may see the VR tennis court and the XR assistant avatar 820 may be rendered as wearing a tennis outfit standing by the tennis court. The user 810 may additionally see an opponent 825 in the VR world 815. In particular embodiments, the XR assistant avatar may also change its voice, emotions, or other attributes. As an example and not by way of limitation, after the user enters into a particular space-adventure game, the XR assistant avatar may start talking like a particular space alien character of the game by transposing verb/noun order, or talking in an alien accent.

Figure 9A:
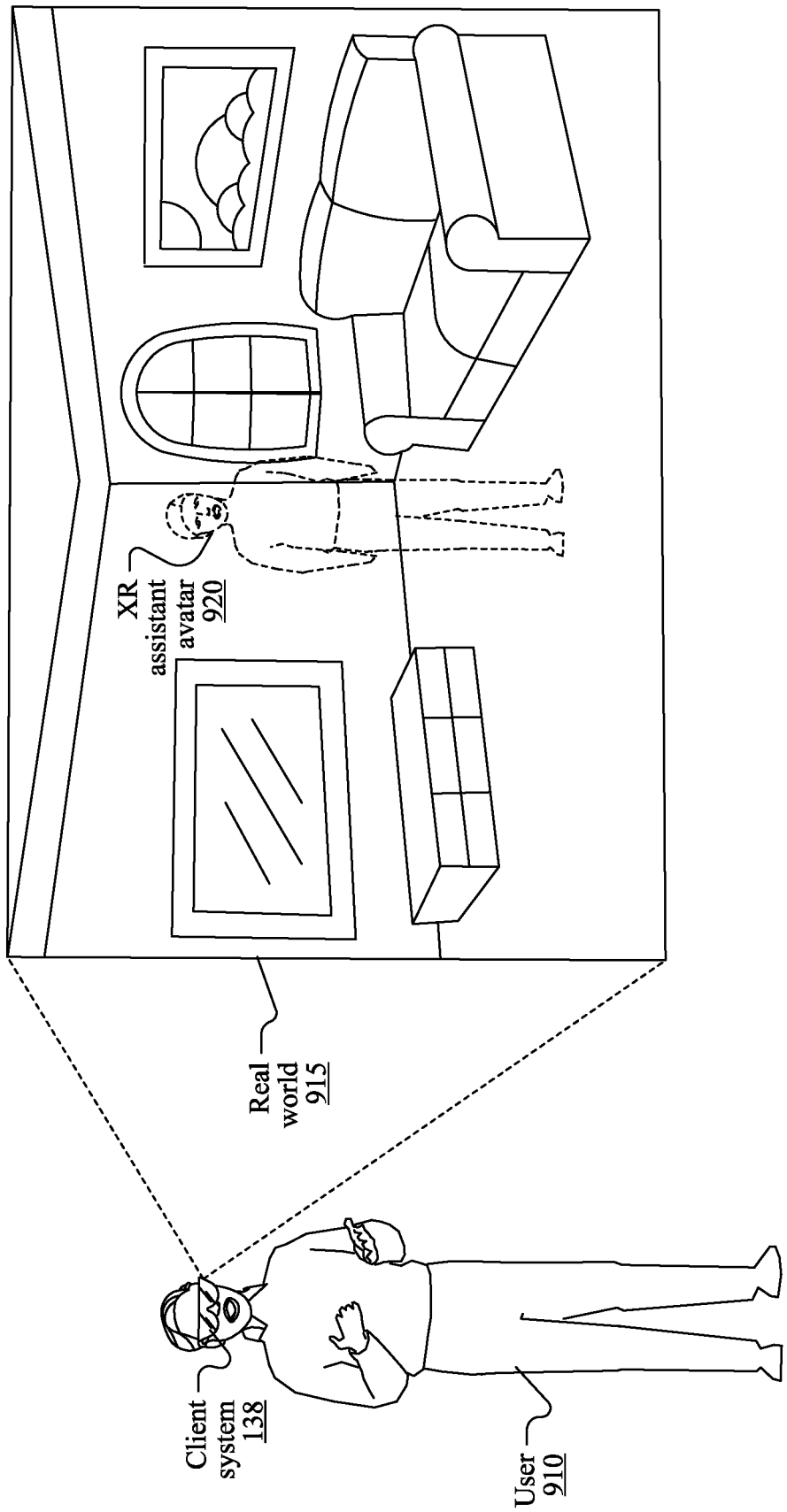
FIGS. 9A-9B illustrate an example AR rendering of the XR assistant avatar.
Figure 9B:
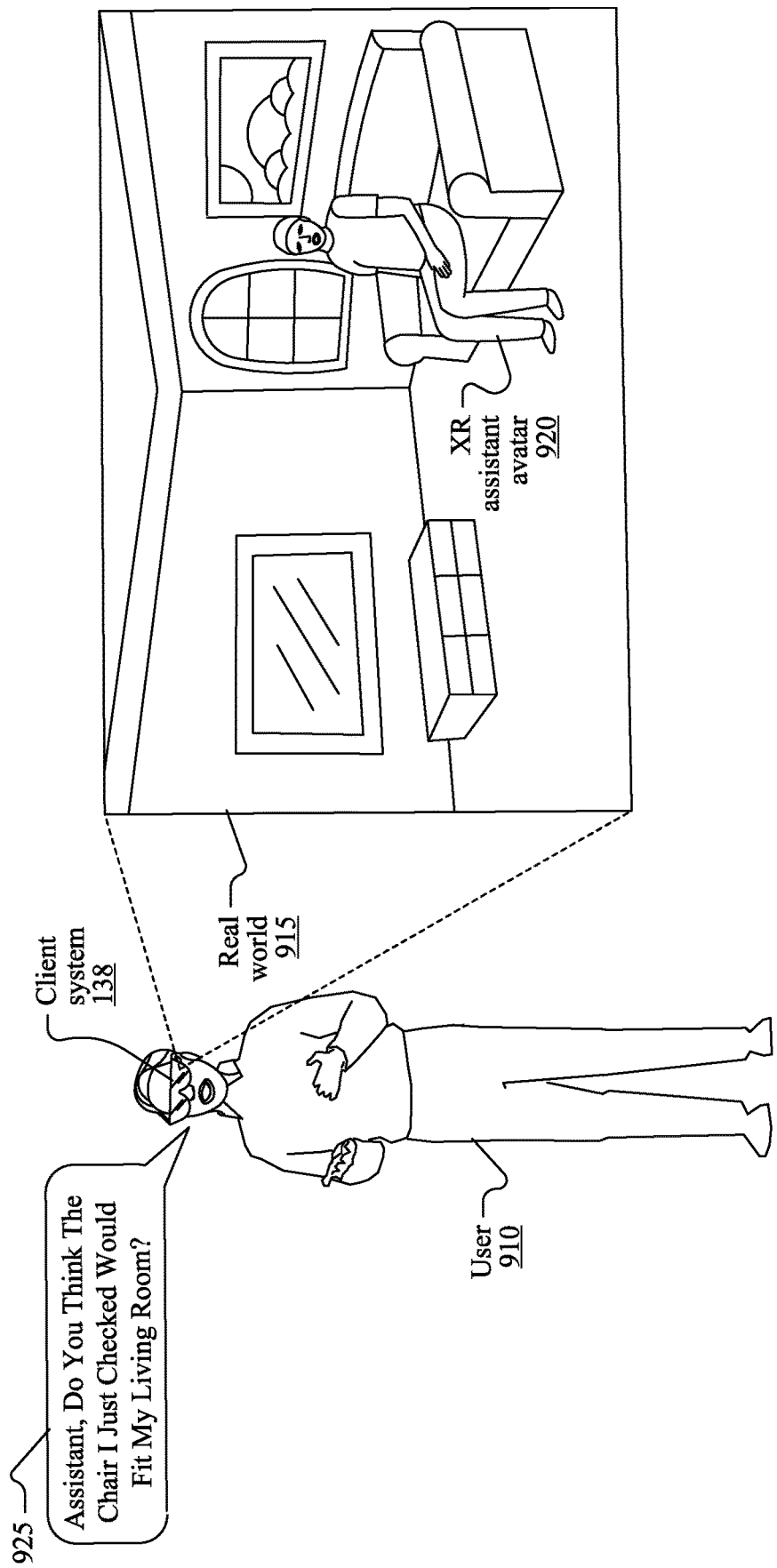

In particular embodiments, the first or second form of the XR assistant avatar may be based on one or more of voice, speech, emotion, tone, pitch, appearance, size, shape, clothing, orientation, position, depth, movement, gesture, facial expression, color, shading, outline, brightness, luminescence, or transparency. Other customizations of the XR assistant avatar may be as follows. The customizations may include modifying the voice, tone, and/or pitch of the XR assistant avatar. The customizations may also include modifying the appearance, size, clothing, or other features of the XR assistant avatar. The customizations may also include modifying the movement, gestures, and/or facial expressions of the XR assistant avatar. The customizations may further include modifying the transparency of the XR assistant avatar. As an example and not by way of limitation, when the user is not interacting with the assistant system 140, the XR assistant avatar may follow the user around and appear semi-transparent. But when the user begins interacting with the assistant system 140 (e.g., by saying a wake word), the XR assistant avatar may morph and become opaque. FIGS. 9A-9B illustrate an example AR rendering of the XR assistant avatar. FIG. 9A shows that a user 910 wearing AR glasses as the client system 138 is walking around in the user's home. The user 910 may see his home in the real world 915 through the lenses of the AR glasses 138. In addition, the AR/VR system 130 may render the XR assistant avatar 920 in the user's home so that the user 910 may request assistance naturally from the XR assistant avatar 920. To not block the user's 910 view while the user 910 is walking around, the XR assistant avatar 920 may be rendered as semi-opaque. FIG. 9B shows that the user 910 is requesting assistance from the XR assistant avatar 920. The user 910 may ask, via a voice command, "assistant, do you think the chair I just checked would fit my living room? 925" As the AR/VR system 130 detects a change of context, e.g., the user 910 is now requesting information rather than just walking around, the AR/VR system 130 may adjust the morphing of the XR assistant avatar 920. Firstly, the XR assistant avatar 920 now is rendered as solid (not semi-opaque anymore). Secondly, the XR assistant avatar 920 is rendered as sitting in the user's 910 couch in the living room so that the user 910 may see how the chair looks like compared to a real person if the AR/VR system 130 later renders the chair near the couch.

In particular embodiments, the XR assistant avatar may be rendered in a way that is customized to an application that a user is using. As an example and not by way of limitation, in a 2D game, the XR assistant avatar may be rendered as merely a 2D profile picture (PFP). As another example and not by way of limitation, in a 3D game, the XR assistant avatar may be rendered as a full 3D avatar, similar to the 3D avatars of other users in the game. As yet another example and not by way of limitation, in an AR environment of an application, the XR assistant avatar may be rendered as an AR avatar overlaying the real-world environment the user is physically in. As described above, a technical advantage of the embodiments may include improving user experience with the assistant system 140 as the XR assistant avatar may be customized according to the user's context such that the user may find the assistant system 140 more intelligent and interactive.

In particular embodiments, the customization of the XR assistant avatar may be triggered by the AR/VR system 130 responsive to the change of context. In particular embodiments, the change of context may comprise one or more of a change in an application state associated with a first application, a change from the first application to a second application, a change in the environment, a change in a pose of the first user with respect to the environment, or a user action associated with the first user. Taking the change in application state or game state as an example, if the user is losing at a game, the XR assistant avatar may be customized to be comforting or nicer to the user. Taking the change from a first application to a second application as another example, if the user changes from a virtual-traveling application to a virtual-dining application, the XR assistant avatar may be rendered from a tour guide to a chef Taking the change in the VR environment as another example, when the user moves from home to a specific game, the XR assistant avatar may be customized to put on appropriate outfit for that game. Taking the change of the pose of the user with respect to the environment or the XR assistant avatar as another example, if the user is inside a VR house and walks outside, the XR assistant avatar may be rendered as wearing sunglasses. If the user is walking around but turns and walks toward the XR assistant avatar, the XR assistant avatar may morph to move out of the way so the user doesn't run into the XR assistant avatar.

Figure 10:
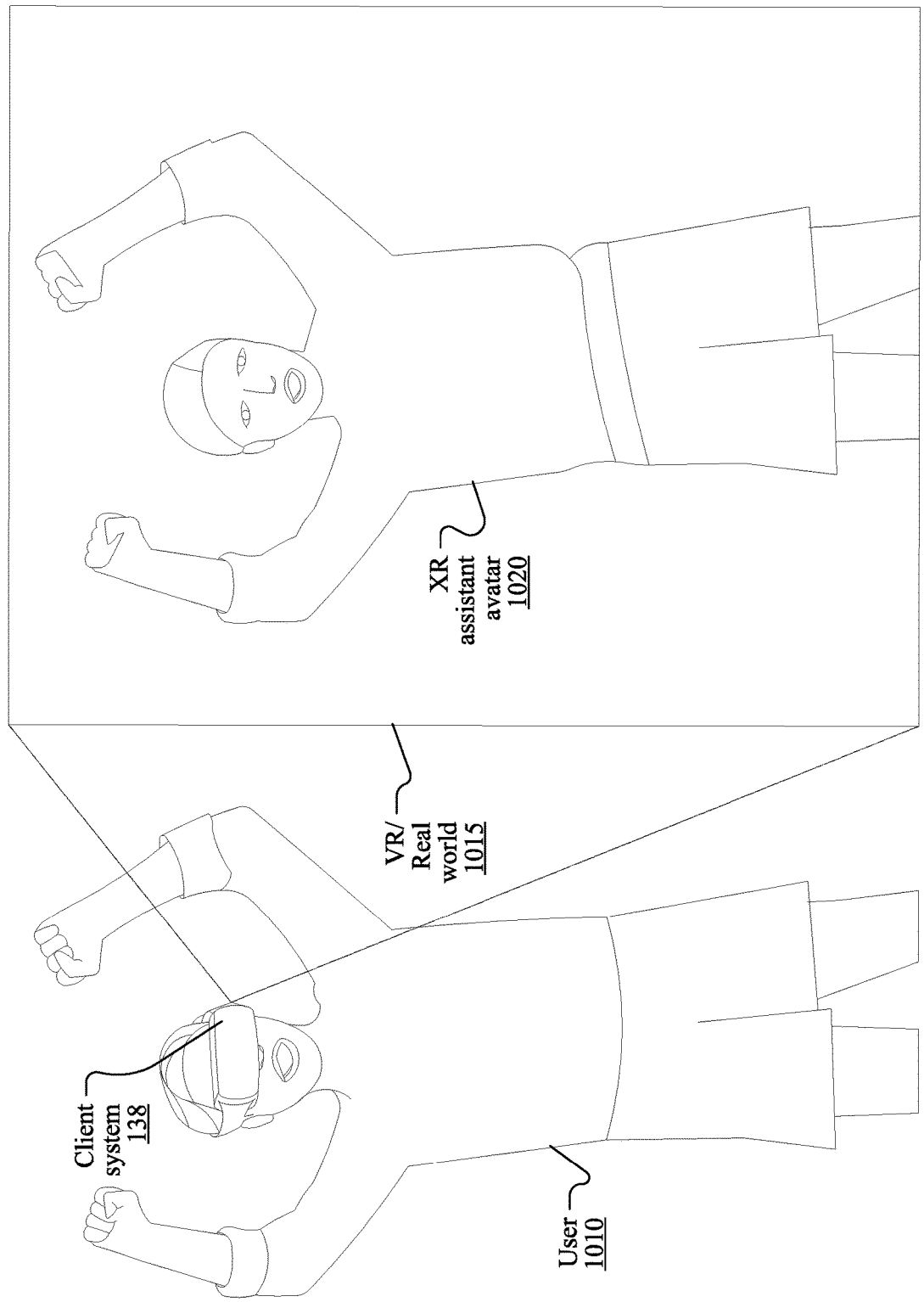
FIG. 10 illustrates an example rendering of the XR assistant avatar responsive to user behaviors.

Taking the change of the user's actions as another example, the XR assistant avatar may be customized to react in an appropriate way to the user's action. If the user is excited, the XR assistant avatar may be excited too. If the user is angry, the XR assistant avatar may be apologetic. In other words, the XR assistant avatar may not merely mimic the user's emotions or actions, but rather react in a customized way to improve the user's experience. FIG. 10 illustrates an example rendering of the XR assistant avatar responsive to user behaviors. In FIG. 10, a user 1010 wearing an XR device as the client system 138 may be exploring the VR or real world 1015. The user 1010 may get excited and be cheering. The AR/VR system 130 may detect such behavior and accordingly render the XR assistant avatar 1020 as also being excited and cheerful. Customizing the XR assistant avatar responsive to the change of context may be an effective solution for addressing the technical challenge of determining when to customize the XR assistant avatar as the change of content may provide informative cues useful for determining what customizations may be more suitable, interesting, and engaging for a user.

As described above, the customization of the XR assistant avatar may be responsive to the user's actions. In particular embodiments, such customization may change over time as the AR/VR system 130 learns more about the user. In particular embodiments, determining the second form and the second pose may be based on a personalization model. As an example and not by way of limitation, the personalization model may be a machine-learning model trained on a plurality of prior reactions associated with the first user with respect to a plurality of morphing of the XR assistant avatar. The personalization model may be thus used to determine how to customize the XR assistant avatar in the future. In other words, the customization may be a dynamic process that is personalized to the user, so the XR assistant avatar may learn new ways to customize to better adapt to the user's needs.

In particular embodiments, it may be not always necessary to change both the form and pose of the XR assistant avatar. The AR/VR system 130 may change just form, just pose, or both for the XR assistant avatar. In other words, the first form and the second form may be a same form or the first pose and the second pose may be a same pose.

Besides changing the look and feel of the XR assistant avatar, the customization of the XR assistant avatar may include changing the set of tasks or actions (intents) executable by the assistant system 140. Responsive to detecting the change in the context of the first user, the AR/VR system 130 may register a first set of actions with the XR assistant avatar based on the change in context of the first user. In particular embodiments, each action in the first set of actions may correspond to a voice-initiated action executable via the assistant system 140. The AR/VR system 130 may further unregister a second set of actions with the XR assistant avatar based on the change in context of the first user. In particular embodiments, each action in the second set of actions may correspond to a voice-initiated action executable via the assistant system 140. As an example and not by way of limitation, if a user goes to a tennis game, the [serve] action may become available. Then if the user transitions to a first-person shooter game, the [serve] action may become unavailable and the [shoot] action may become available. In other words, each application/environment may have its own set of tasks/actions available, and therefore what a user can do via the assistant system 140 may change as the user changes applications/environments. More information on action registry management may be found in U.S. patent application Ser. No. 17/725,540, filed 20 Apr. 2022, which is incorporated by reference.

In particular embodiments, the customization may include rendering the XR assistant avatar in a way that it looks more animated or realistic. In other words, rendering the first or second output image of the XR assistant avatar may comprise rendering the XR assistant avatar as a human-like avatar, meaning it may have a humanoid appearance. As an example and not by way of limitation, the XR assistant avatar may look like other users in the VR space. Thus, the XR assistant avatar may have motion and audio cues that are more animated and/or realistic to convey responses and emotions better to the user. However, the XR assistant avatar may not need to be rendered as humanlike. In particular embodiments, rendering the first or second output image of the XR assistant avatar may comprise rendering the XR assistant avatar as an animated object or icon. As an example and not by way of limitation, the XR assistant avatar may be rendered as a twisting infinity logo. This non-humanlike avatar may be given animations to similarly convey responses and emotions.

In particular embodiments, the animated/realistic rendering may include inserting emotion, non-verbal ticks, filler sounds (e.g., umm . . . , like . . . , etc.), etc. to the responses of the XR assistant avatar. These may be rendered in both audio and visual modalities. In particular embodiments, the AR/VR system 130 may also automatically animate movement of the XR assistant avatar based on what the avatar is saying plus the current context (e.g., the current context of the user, location, etc.). That way, the XR assistant avatar may be not just doing the same animation over and over, which may be noticeable to the user and not realistic.

In particular embodiments, the AR/VR system 130 may also observe how the user behaves (e.g., moving around) and use that observation as a factor to determine the user's sentiment. The AR/VR system 130 may know how the user moves when they feel a certain way, and then use these same body movements to convey similar emotions to make the XR assistant avatar more relatable to a particular user. In particular embodiments, the AR/VR system 130 may detect one or more user behaviors associated with the first user. The AR/VR system 130 may then determine, based on the one or more user behaviors, one or more user sentiments associated with the first user. In particular embodiments, determining the second form and the second pose may be further based on the one or more user sentiments. As an example and not by way of limitation, the AR/VR system 130 may detect user behaviors as moving quickly, doing things quickly, etc. The AR/VR system 130 may then determine user sentiment as being impatient. Accordingly, the AR/VR system 130 may render the XR assistant avatar as speaking faster.

In particular embodiments, the assistant system 140 may provide a way for the user to interact with the XR assistant avatar in a conversation manner (i.e., natural-language dialog). The AR/VR system 130 may determine one or more natural-language responses for the XR assistant avatar associated with the rendering of the second output image of the XR assistant avatar. The one or more natural-language responses may be responsive to one or more user requests from the first user. In particular embodiments, the one or more natural-language responses may be customized for the first user based on the change in the context. As an example and not by way of limitation, if the user changes from a studying application to a gaming application, the natural-language responses may change from more formal to more casual.

In particular embodiments, the one or more natural-language responses may be customized further based on an application the first user is currently engaged with. As an example and not by way of limitation, if the user is playing a first-person shooter game, the user may ask about specific missions or weapons. The XR assistant avatar may get answers extracted from the game information and present them to the user in a conversation manner. In other words, the XR assistant avatar may allow application-specific natural-language question and answering (Q&A) about an application.

In particular embodiments, the XR assistant avatar may also handle out-of-domain (OOD) questions in any application. As an example and not by way of limitation, if the user is in a space-adventure game and asks "hey assistant, what's the weather on the moon?", the XR assistant avatar may provide an answer. But if the user moves to another application and asks the same question, conventional assistants may not be able to answer it (e.g., because they may try to access a weather application and get a null/failure answer). In particular embodiments, the assistant system 140 may generate relevant conversational responses so that these OOD questions may not lead to failures or non-responses. Continuing with the previous example, the XR assistant avatar may respond "I don't know about the weather on the moon. But I know the moon doesn't have an atmosphere." More information on conversation/chit-chat responses may be found in U.S. Provisional Patent Application No. 63/168,188, filed 30 Mar. 2021, which is incorporated by reference. In particular embodiments, the assistant system 140 may allow the XR assistant avatar to respond to multi-turn interactions from the user, where the user may reference things mentioned much earlier in the conversation and the XR assistant avatar may know what the user refers to.

Figure 11:
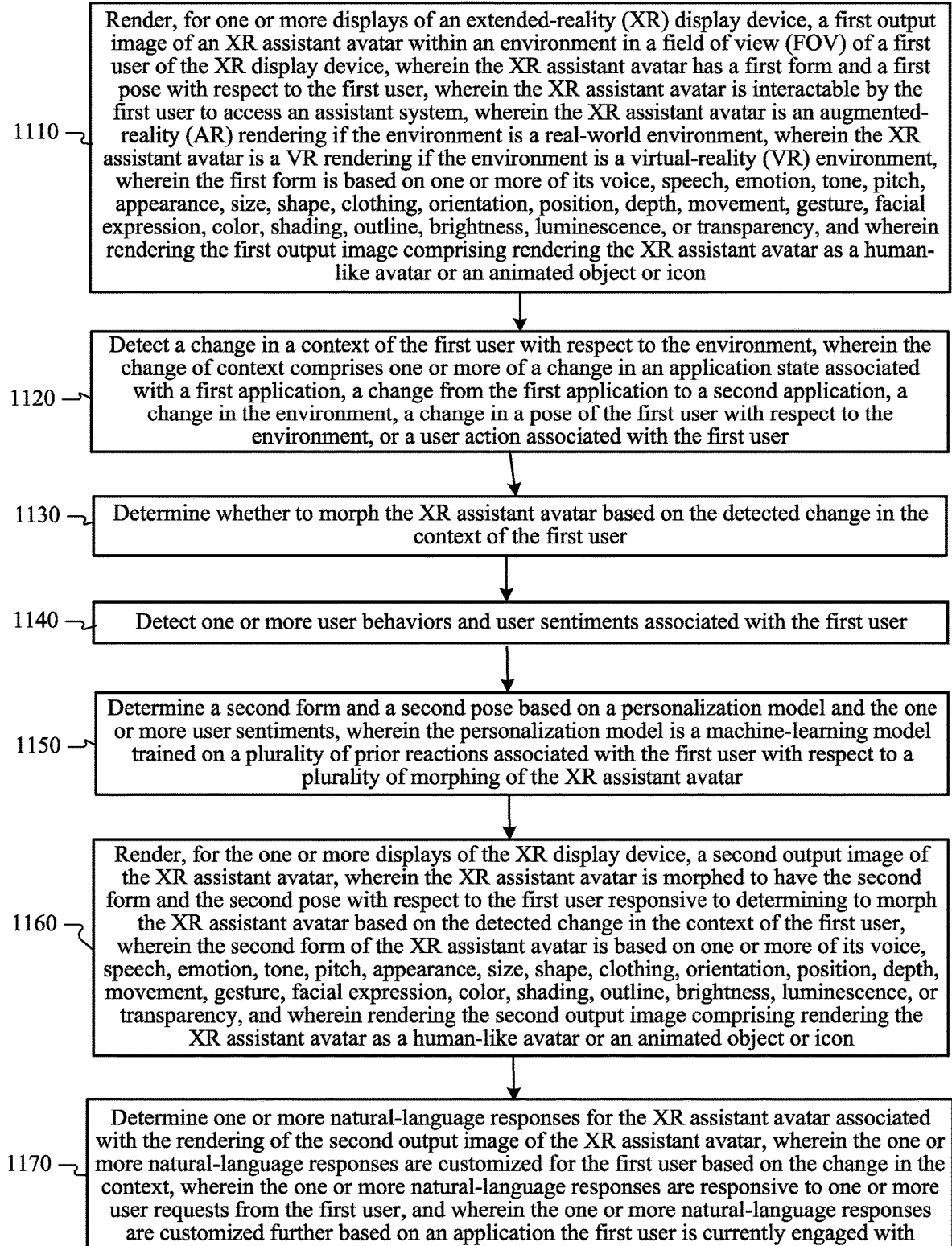
FIG. 11 illustrates an example method for morphing a virtual assistant avatar.

FIG. 11 illustrates an example method 1100 for morphing a virtual assistant avatar. The method may begin at step 1110, where the AR/VR system 130 may render, for one or more displays of an extended-reality (XR) display device, a first output image of an XR assistant avatar within an environment in a field of view (FOV) of a first user of the XR display device, wherein the XR assistant avatar has a first form and a first pose with respect to the first user, wherein the XR assistant avatar is interactable by the first user to access an assistant system, wherein the XR assistant avatar is an augmented-reality (AR) rendering if the environment is a real-world environment, wherein the XR assistant avatar is a VR rendering if the environment is a virtual-reality (VR) environment, wherein the first form is based on one or more of its voice, speech, emotion, tone, pitch, appearance, size, shape, clothing, orientation, position, depth, movement, gesture, facial expression, color, shading, outline, brightness, luminescence, or transparency, and wherein rendering the first output image comprising rendering the XR assistant avatar as a human-like avatar or an animated object or icon. At step 1120, the AR/VR system 130 may detect a change in a context of the first user with respect to the environment, wherein the change of context comprises one or more of a change in an application state associated with a first application, a change from the first application to a second application, a change in the environment, a change in a pose of the first user with respect to the environment, or a user action associated with the first user. At step 1130, the AR/VR system 130 may determine whether to morph the XR assistant avatar based on the detected change in the context of the first user. At step 1140, the AR/VR system 130 may detect one or more user behaviors and user sentiments associated with the first user. At step 1150, the AR/VR system 130 may determine a second form and a second pose based on a personalization model and the one or more user sentiments, wherein the personalization model is a machine-learning model trained on a plurality of prior reactions associated with the first user with respect to a plurality of morphing of the XR assistant avatar. At step 1160, the AR/VR system 130 may render, for the one or more displays of the XR display device, a second output image of the XR assistant avatar, wherein the XR assistant avatar is morphed to have the second form and the second pose with respect to the first user responsive to determining to morph the XR assistant avatar based on the detected change in the context of the first user, wherein the second form of the XR assistant avatar is based on one or more of its voice, speech, emotion, tone, pitch, appearance, size, shape, clothing, orientation, position, depth, movement, gesture, facial expression, color, shading, outline, brightness, luminescence, or transparency, and wherein rendering the second output image comprising rendering the XR assistant avatar as a human-like avatar or an animated object or icon. At step 1170, the AR/VR system 130 may determine one or more natural-language responses for the XR assistant avatar associated with the rendering of the second output image of the XR assistant avatar, wherein the one or more natural-language responses are customized for the first user based on the change in the context, wherein the one or more natural-language responses are responsive to one or more user requests from the first user, and wherein the one or more natural-language responses are customized further based on an application the first user is currently engaged with. In particular embodiments, the application developers associated with the first or second application may be able to add restrictions to the rendering of the XR assistant avatar, e.g., movement or positioning, based on the assistant SDK. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for morphing a virtual assistant avatar including the particular steps of the method of FIG. 11, this disclosure contemplates any suitable method for morphing a virtual assistant avatar including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Integrating Applications with Dynamic Virtual Assistant Avatars

In particular embodiments, the AR/VR system 130 may integrate first-party and third-party applications into the assistant system 140 via instructions provided to application developers on how to render the XR assistant avatar in the AR/VR application environments. The XR assistant avatar may be rendered as an "embodied assistant" that transfers around with a user, in and out of applications, to different VR environments, or into real-world environments when the user puts on XR devices, etc. The XR assistant avatar may also be customized by each user within a specific application, subject to what features are provided by the application developer. With the application integration, the XR assistant avatar may provide various benefits to both application developers and users, including business and creator support, facilitation of commerce for applications, and proactive outreach. Although this disclosure describes integrating particular applications by morphing particular avatars by particular systems (e.g., the AR/VR system 130) in a particular manner, this disclosure contemplates integrating any suitable application by morphing any suitable avatar by any suitable system (e.g., the assistant system 140) in any suitable manner.

In particular embodiments, the AR/VR system 130 may render, for one or more displays of an extended-reality (XR) display device, a first output image of an XR assistant avatar within a first environment associated with a first XR application. The XR assistant avatar may have a first form according to a first rendering specification associated with the first XR application. In particular embodiments, the XR assistant avatar may be interactable by a first user of the XR display device to access an assistant system 140. The AR/VR system 130 may then receive an indication that the first user is switching from the first XR application to a second XR application. The AR/VR system 130 may then access a second rendering specification associated with the second XR application. In particular embodiments, the AR/VR system 130 may further render, for one or more displays of a second XR display device, a second output image of the XR assistant avatar within a second environment associated with the second XR application. The XR assistant avatar may be rendered to have a second form according to the second rendering specification associated with the second XR application.

In particular embodiments, the one or more computing systems may comprise the first or second XR display device. This may indicate morphing the XR assistant avatar is performed by the AR/VR system 130. In alternative embodiments, the one or more computing systems may comprise the assistant system 140. Correspondingly, the morphing of the XR assistant avatar may be performed by the assistant system 140.

In particular embodiments, the first or second rendering specification may be specific to the first or second XR display device. As an example and not by way of limitation, rendering specification for a VR headset may be different from that for a pair of AR glasses. As another example and not by way of limitation, a user may have two VR headsets but rendering specification for the first VR headset may be different from that for the second VR headset (e.g., due to user preferences, parental control, etc.). In particular embodiments, the first XR display device and the second XR display may be a same device whereas the first XR application and the second XR application may be different applications. This may indicate that the user is switching from the first XR application to the second XR application on the same device. As an example and not by way of limitation, the user may be using a VR headset and switching from a VR tennis game to a VR travelling application. In particular embodiments, switching from the first XR application to the second XR application may mean closing the first XR application and opening the second XR application. Switching from the first XR application to the second XR application may be one type of change of context. In particular embodiments, the application developers associated with the first or second XR application may be able to add restrictions to the rendering of the XR assistant avatar, e.g., movement or positioning, based on the assistant SDK.

In particular embodiments, the AR/VR system 130 may receive an indication that the first user is switching from the first XR display device to the second XR display device. The first XR display device and the second XR display device may be different devices. As an example and not by way of limitation, the first XR display device may be a 2D device (e.g., a smart phone or a smart table) and the second XR display device may be a 3D device (e.g., a VR headset or AR glasses). In particular embodiments, the first XR application and the second XR application may be the same application. In this scenario, the user may be using the same application but switching between different devices. As an example and not by way of limitation, the user may be using an AR home-renovation application. The user may be switching from a smart phone with AR functions to AR glasses to have a better feel about a renovation idea. However, the user may be still using the same AR home-renovation application. In particular embodiments, the first XR application and the second XR application may be the same application. In this scenario, the user may be switching both the devices and applications. As an example and not by way of limitation, the user may firstly use a VR headset playing a VR game and then switch to an AR headset using an AR measuring application. In particular embodiments, the user may switch from the second XR display device to the first XR display device anytime and vice versa.

In particular embodiments, the first or second environment may be a real-world environment. Accordingly, the XR assistant avatar may be an augmented-reality (AR) rendering. As an example and not by way of limitation, the AR rendering of the XR assistant avatar may be positioned in a couch of a user's living room in the real world. In particular embodiments, the first or second environment may be a virtual-reality (VR) environment. Accordingly, the XR assistant avatar may be a VR rendering. As an example and not by way of limitation, a user may be wearing a VR headset experiencing the VR world and the XR assistant avatar may be rendered in the VR world accompanying the user.

In particular embodiments, the first or second rendering specification may be based on instructions specified in a software development kit associated with the assistant system 140. As an example and not by way of limitation, the first or second rendering specification may comprise one or more of an executable command for rendering the XR assistant avatar, an executable script for rendering the XR assistant avatar, a context for rendering the XR assistant avatar, a scene for rendering the XR assistant avatar, a perspective projection for rendering the XR assistant avatar, an object-attribute (e.g., color, size, shape, etc.) for rendering the XR assistant avatar, or a field of view for rendering the XR assistant avatar. Determining the morphing of the XR assistant avatar based on rendering specification specific to the XR display device and the application being switched to may be an effective solution for addressing the technical challenge of morphing the XR assistant avatar responsive to the user switching between different applications as the rendering specification may comprise instructions specified by the application developer on how to morph the XR assistant avatar under various scenario with different contexts.

In particular embodiments, the interface for the assistant system 140 may be embodied in the XR assistant avatar, which may always be presented to the user, on any surface, in any environment, real or virtual. Because the XR assistant avatar is always with the user, the assistant system 140 may be used to interact with both VR objects and real-world objects viewed from AR headsets. As an example and not by way of limitation, for a user wearing a VR headset, the user may instruct the XR assistant avatar to interact with both VR objects and MR objects (i.e., real-world objects rendered into the VR environment). Similarly, for a user wearing AR glasses, the user may instruct the XR assistant avatar to interact with both real-world objects and AR objects (i.e., virtual objects rendered as an overlay onto the real-world environment).

In particular embodiments, the application developers may be able to add restrictions to the rendering of the XR assistant avatar, e.g., movement or positioning, based on the assistant SDK. With first-party applications, the XR assistant avatar may be able to follow the user around everywhere within the environment, subject to constraints provided by the first-party application developer. For third-party applications, an application developer may need to specify where the XR assistant avatar can be rendered (i.e., with respect to the user) in the environment. As an example and not by way of limitation, the XR assistant avatar may be defined by the application developer to be rendered only in certain places in the application. In particular embodiment, the software development kit (SDK) associated with the assistant system 140 may provide instructions to the application developer (both first-party and third-party) on how to render the XR assistant avatar and how to engage with the assistant system 140 (e.g., via a voice SDK). As an example and not by way of limitation, the assistant SDK may instruct application developers on how to specify boundaries for where the XR assistant avatar should appear in the AR or VR environment associated with the application. The assistant SDK may allow developers to customize how XR assistant avatar is rendered in the application, which can differ from the default renderings to a certain extent. As an example and not by way of limitation, a third-party developer may specify that when the user enters the application, the XR assistant avatar may be shrunk to occupy less of the user's field of view, and perhaps be moved to a peripheral location. However, the developer may not be able to change certain aspects of the XR assistant avatar. As an example and not by way of limitation, the developer may be required to maintain certain features of XR assistant avatar in the rendering, such as the shape of the avatar's face and hair, so that the user still recognizes the XR assistant avatar as being their personal avatar. This may also help an enterprise associated with the assistant system 140 maintain branding for its XR assistant avatar.

In particular embodiments, the XR assistant avatar may also act as a replacement for a VR guardian system (i.e., safety system). The VR guardian system may display guardian boundary as in-application wall and floor markers when users get near play-area borders they defined. When the user gets too close to the edge of a boundary, a translucent mesh grid may be displayed as a layer that is superimposed over the game or experience. Instead of having guardian boundaries flash up when the user approaches the boundary, the AR/VR system 130 may instead have the XR assistant avatar stand near the wall, but not beyond the boundary. Thus, the position of the XR assistant avatar may signal to the user where the safe zone is in which they can move around in the VR environment.

In particular embodiments, the XR assistant avatar may also transform into customized avatars (e.g., non-player characters) in particular applications. In other words, the form of the XR assistant avatar may change based on the application the user is engaged with. In particular embodiments, the first or second form of the XR assistant avatar may be based on one or more of its voice, speech, emotion, tone, pitch, appearance, size, shape, clothing, orientation, position, depth, movement, gesture, facial expression, color, shading, outline, brightness, luminescence, or transparency. Other customizations of the XR assistant avatar may be as follows. The customizations may include modifying the voice, tone, and/or pitch of the XR assistant avatar. The customizations may also include modifying the appearance, size, clothing, or other features of the XR assistant avatar. The customizations may also include modifying the movement, gestures, and/or facial expressions of the XR assistant avatar. The customizations may further include modifying the transparency of the XR assistant avatar.

Figure 12A:
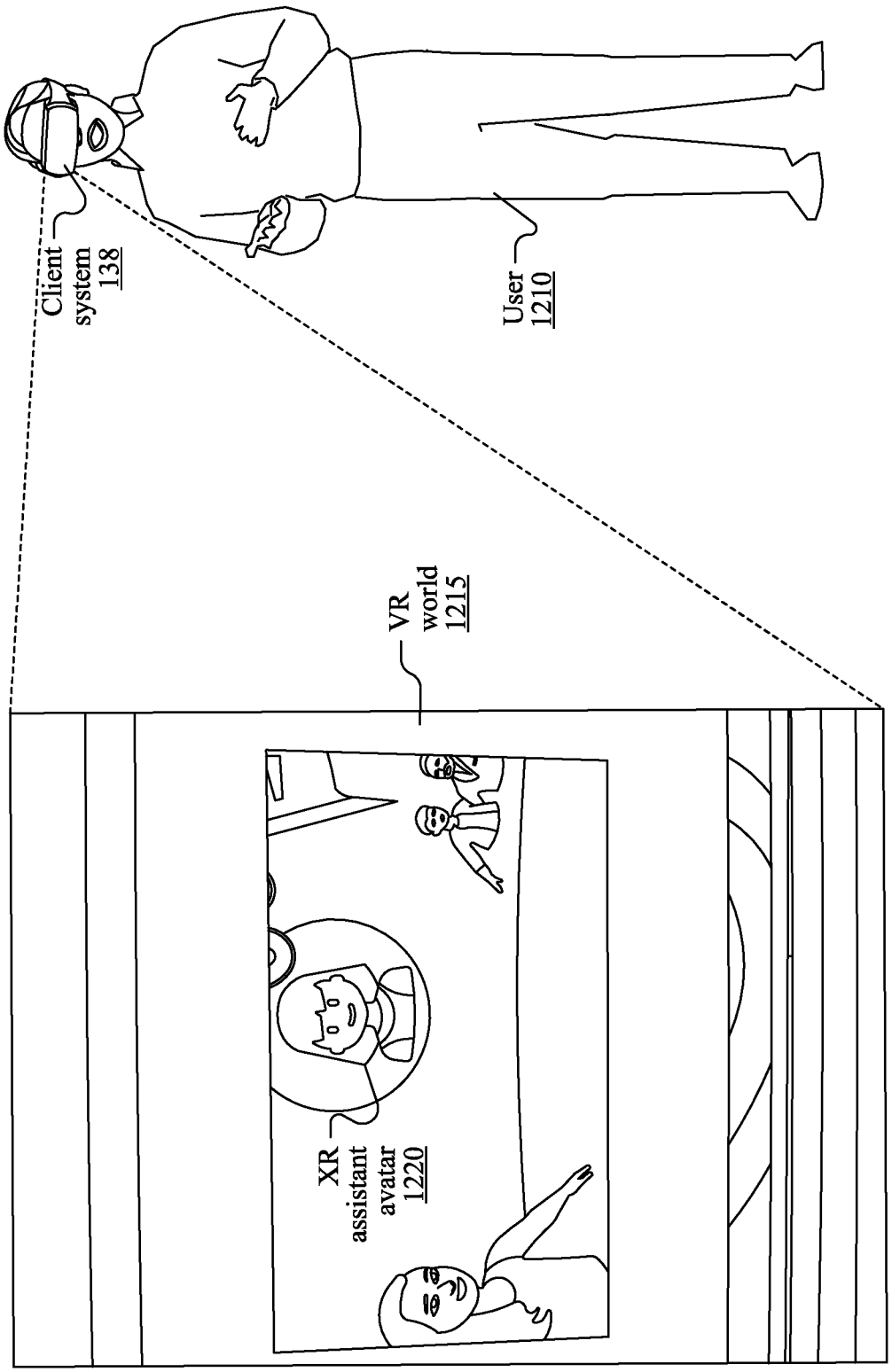
FIGS. 12A-12C illustrate example rendering of the XR assistant avatar corresponding to different contexts and applications.
Figure 12B:
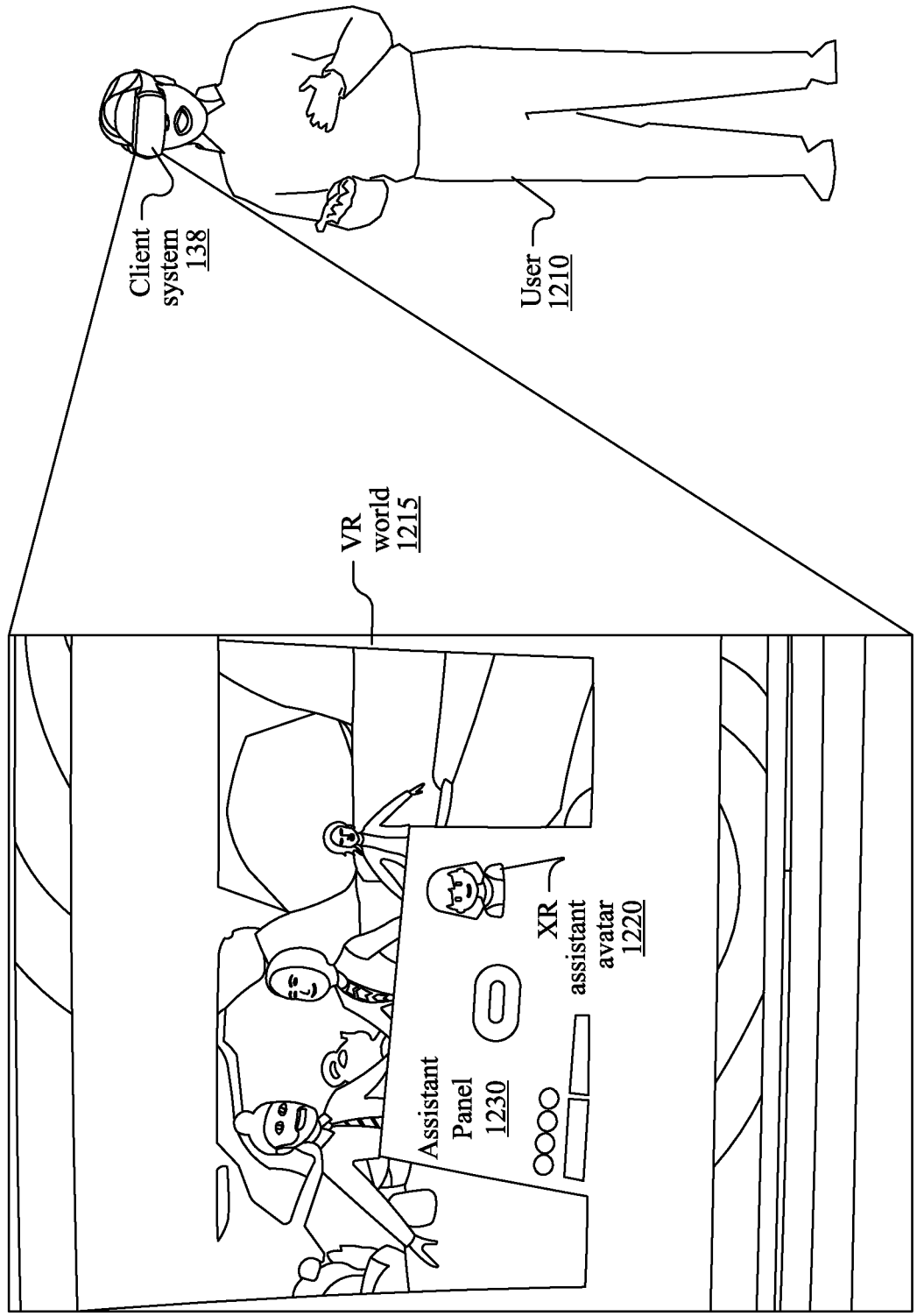
Figure 12C:
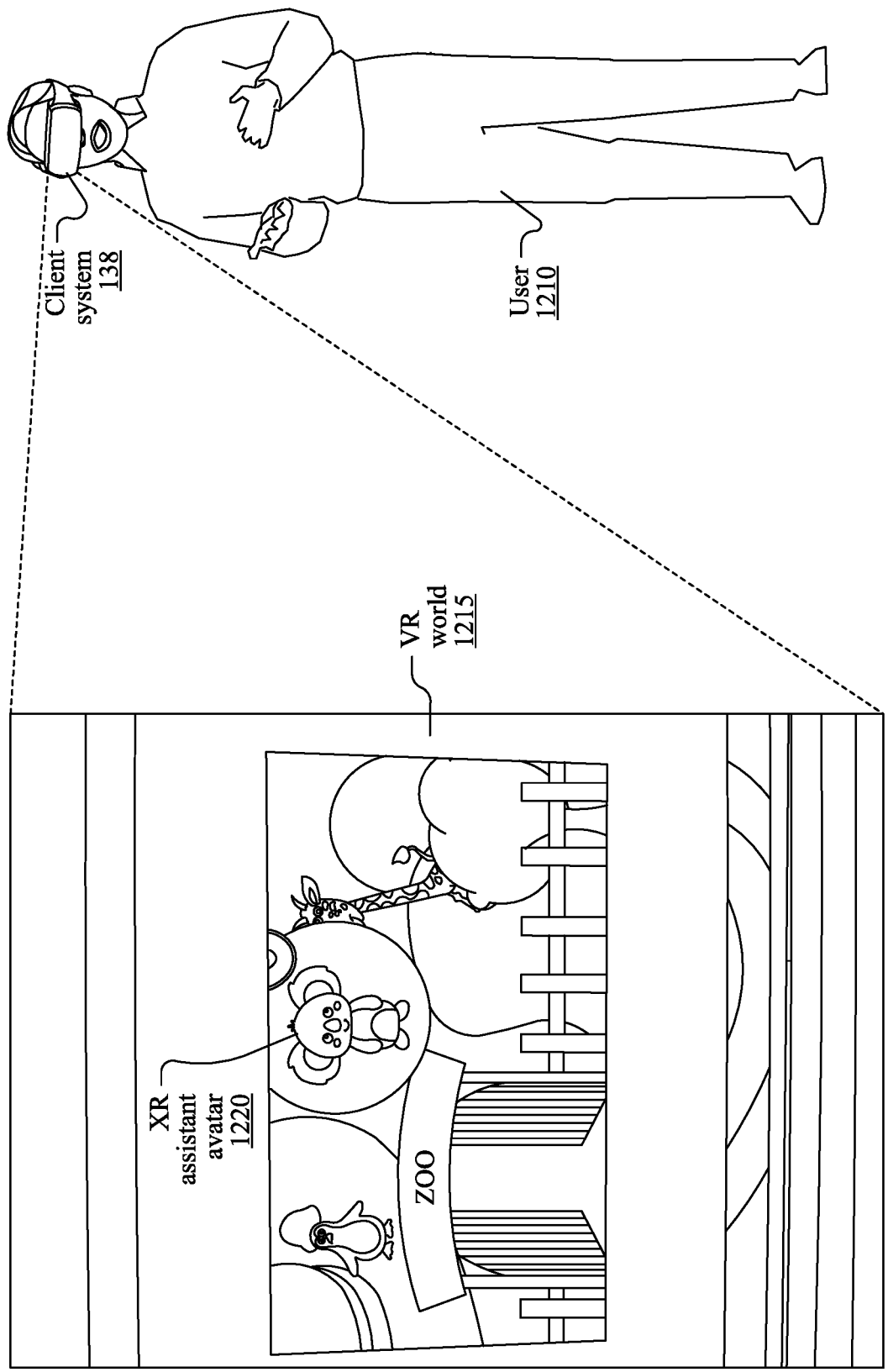

FIGS. 12A-12C illustrate example rendering of the XR assistant avatar corresponding to different contexts and applications. FIG. 12A shows that a user 1210 wearing a VR headset as the client system 138 is using a virtual conferencing application to attend a virtual conference in the VR world 1215. The user 1210 may have just entered the virtual conference venue. Accordingly, the XR assistant avatar 1220 may be rendered as a companion guiding the user 1210 through the venue. FIG. 12B shows that the XR assistant avatar 1220 has led the user 1210 to the people whom he needs to meet. Upon detecting such change of context, the AR/VR system 130 may change the morphing of the XR assistant avatar 1220. The XR assistant avatar 1220 may be rendered as a smaller icon inside an assistant panel 1230 to avoid confusion. In addition, the position of the assistant panel 1230 and the XR assistant avatar 1220 may be adjusted from the center of the view of the user 1210 to the bottom to not obfuscate the view of the user 1210 while he interacts with others. FIG. 12C shows that the user 1210 switched from the virtual conferencing application to a virtual zoo-touring application. Accordingly, the XR assistant avatar 1220 may be rendered as an animal guiding the user 1210 through the zoo to make the user experience more interesting. Although this example contemplates rendering the XR assistant avatar corresponding to different contexts and applications in the VR world, rendering the XR assistant avatar corresponding to different contexts and applications can be similarly used for AR scenarios in the real world.

In particular embodiments, the XR assistant avatar may further have a first pose according to the first rendering specification associated with the first XR application. Similarly, the XR assistant avatar may further have a second pose according to the second rendering specification associated with the second XR application. As an example and not by way of limitation, the pose for a gaming application may be standing whereas the pose for a move application may be sitting.

In particular embodiments, the application developers may be able to add restrictions to the rendering of the XR assistant avatar, e.g., movement or positioning, based on the assistant SDK. In particular embodiments, the customization may be subject to certain constraints imposed by the assistant system 140. This customization may be provided by the assistant system 140, which may increase user engagement with the assistant system 140. In other words, the XR assistant avatar may serve as a highly personalized virtual assistant for each user. As an example and not by way of limitation, if a user enters a VR shopping application, the XR assistant avatar may become a VR salesclerk in the marketplace and assist the user with their shopping experience and checkout. Because the salesclerk is the user's personal XR assistant avatar, the user may know they can trust the purchase flow (e.g., that it is safe to provide a credit card number to the XR assistant avatar).

In particular embodiments, the XR assistant avatar may also be customized by each user within a specific application, subject to what customization features are provided by the application developer. In other words, this may be a customization of the avatar provided by the application. As an example and not by way of limitation, the general XR assistant avatar customization may not allow the user to change the clothes of the XR assistant avatar to a tennis outfit. However, a third-party tennis application may provide instructions for rendering a tennis outfit for the XR assistant avatar and may further provide the user with options for customizing the tennis outfit when the user is in the tennis application. In other words, certain customization features may only be available in certain applications. In particular embodiments, this customization may be voice driven. As a result, the user may tell the XR assistant avatar with voice commands such as "change to the red tennis outfit" or "make your hair shorter."

In particular embodiments, the AR/VR system 130 may also observe how the user behaves (e.g., moving around) and use that observation as a factor to determine the user's sentiment. The AR/VR system 130 may know how the user moves when they feel a certain way, and then use these same body movements to convey similar emotions to make the XR assistant avatar more relatable to a particular user. In particular embodiments, the AR/VR system 130 may detect one or more user behaviors associated with the first user. The AR/VR system 130 may then determine, based on the one or more user behaviors, one or more user sentiments associated with the first user. Accordingly, determining the second form may be based on the one or more user sentiments. As an example and not by way of limitation, the AR/VR system 130 may detect user behaviors as moving quickly, doing things quickly, etc. The AR/VR system 130 may then determine user sentiment as being impatient. Accordingly, the AR/VR system 130 may morphing the XR assistant avatar as speaking faster.

In particular embodiments, determining the second form may be based on a personalization model. As an example and not by way of limitation, the personalization model may be a machine-learning model trained on a plurality of prior reactions associated with the first user with respect to a plurality of morphing of the XR assistant avatar. As an example and not by way of limitation, prior reactions of the first user to morphing of the XR assistant avatar may indicate that when switching from a gaming application to an educational application, the first user always had positive feedback to a change of form from a smaller size to a bigger size. Accordingly, the personalization machine-learning model may be trained to capture such preferences when determining the second form in the future. As can be seen, morphing of the XR assistant avatar may be a dynamic process that is personalized to the user, so the XR assistant avatar may learn new ways to morph to better adapt to the user's needs.

Besides changing the form of the XR assistant avatar, the AR/VR system 130 may further change the set of tasks or actions (intents) executable by the assistant system 140. Responsive to receiving the indication that the first user is switching from the first XR application to the second XR application, the AR/VR system 130 may register a first set of actions with the XR assistant avatar based on the switching from the first XR application to the second XR application. In particular embodiments, each action in the first set of actions may correspond to a first voice-initiated action executable via the assistant system 140. The AR/VR system 130 may further unregister a second set of actions with the XR assistant avatar based on the switching from the first XR application to the second XR application. In particular embodiments, each action in the second set of actions may correspond to a second voice-initiated action executable via the assistant system 140. As an example and not by way of limitation, if a user goes to a tennis game, the [serve] action may become available. Then if the user transitions to a first-person shooter game, the [serve] action may become unavailable and the [shoot] action may become available. In other words, each application/environment may have its own set of tasks/actions available, and thus what a user can do via the assistant system 140 may change as the user changes applications. More information on action registry management may be found in U.S. patent application Ser. No. 17/725,540, filed 20 Apr. 2022, which is incorporated by reference.

In particular embodiments, rendering the first or second output image of the XR assistant avatar may comprise rendering the XR assistant avatar as a human-like avatar, meaning it may have a humanoid appearance. As an example and not by way of limitation, the XR assistant avatar may look like other users in the VR space. Thus, the XR assistant avatar may have motion and audio cues that are more animated and/or realistic to convey responses and emotions better to the user. However, the XR assistant avatar may not need to be rendered as humanlike. In particular embodiments, rendering the first or second output image of the XR assistant avatar may comprise rendering the XR assistant avatar as an animated object or icon. As an example and not by way of limitation, the XR assistant avatar may be rendered as a twisting infinity logo. This non-humanlike avatar may be given animations to similarly convey responses and emotions.

In particular embodiments, the assistant system 140 may provide a way for the user to interact with the XR assistant avatar in a conversation manner (i.e., natural-language dialog). The AR/VR system 130 may determine one or more natural-language responses for the XR assistant avatar associated with the rendering of the second output image of the XR assistant avatar. In particular embodiments, the one or more natural-language responses may be customized for the first user based on the second application the first user is switching to. As an example and not by way of limitation, if the user is switching to a first-person shooter game, the user may ask about specific missions or weapons. The XR assistant avatar may get answers extracted from the game information and present them to the user in a conversation manner.

With the XR assistant avatar, the assistant system 140 may provide various benefits to both application developers and users. In particular embodiments, the XR assistant avatar may provide business and creator support. The XR assistant avatar may help application developers and content creators get promoted and connect with users. The XR assistant avatar may serve as a business-focused assistant and approach business page admins (i.e., admins of applications and content creators) and walk them through the support process. As an example and not by way of limitation, if there is a particular artist/musician performing on a stage platform, there may be an advertiser looking at advertising during the event. The advertiser's representative may enter the VR environment to view the venue, and the XR assistant avatar may guide them through the stage area and help them see what advertising would look like. Then the XR assistant avatar may connect the advertiser's representative to a live service representative for the event if needed. The XR assistant avatar may also help the business page administrator create content in the metaverse. As an example and not by way of limitation, if a business page admin has an empty VR space that they want to build a virtual storefront on, the XR assistant avatar may help guide them through the process of building the virtual storefront. Additionally, the XR assistant avatar may make suggestions on how to customize different tasks based on what it knows about the business the user is involved in.

In particular embodiments, the XR assistant avatar may facilitate commerce for applications. The XR assistant avatar may serve as a system-level interface for handling common commerce tasks. This may comprise payments/purchases, adjusting system settings, application FAQ, and education. The assistant SDK may allow application developers to directly plug in these functionalities into their applications without having to build them out. As an example and not by way of limitation, rather than having each application developer create their own payment flow in their applications, there may be a common payment flow in the VR environment that is implemented via the XR assistant avatar. In other words, all purchases/check-outs may be done through the XR assistant avatar. Since the XR assistant avatar is a trusted entity, the user may know that they can trust the payment flow. As a result, the embodiments disclosed herein may have a technical advantage of enabling application developers to easily incorporate functions to their applications. Additionally, the XR assistant avatar may also provide commercial information back to application developers. As an example and not by way of limitation, the XR assistant avatar may serve as an interactive virtual dashboard for delivering sales/purchase information, return-on-investment information (e.g., advertising performance), etc.

In particular embodiments, the XR assistant avatar may provide proactive outreach, i.e., delivering relevant information at the right time. The XR assistant avatar may serve as a portal for providing content suggestions and other relevant information to users. The XR assistant avatar may similarly provide content suggestions in reactive use cases (i.e., responsive to user requests/actions). In particular embodiments, the AR/VR system 130 may generate, based on context associated with the first user, one or more proactive suggestions. The AR/VR system 130 may further provide, via the XR assistant avatar by the assistant system 140, one or more of the proactive suggestions to the first user. In particular embodiments, the provided proactive suggestions may be associated with the first or second output image of the XR assistant avatar. As an example and not by way of limitation, if the user is engaged with their VR headset and is interested in a certain musician, the XR assistant avatar may let the user know that a virtual concert by the musician is about to begin and help the user teleport to the correct stage platform to watch. The XR assistant avatar may also provide suggestions when the user is trying to do something new or when the user is struggling to do something. As an example and not by way of limitation, if a user is setting up a VR headset for the first time, the XR assistant avatar may respond directly to questions when asked about something in the setup process. As another example and not by way of limitation, if the assistant system 140 notices the user is struggling to do something (e.g., the user is searching through system settings for a long time), the XR assistant avatar may determine what the user is trying to do and ask the user if they need help. Proactive outreach may be applicable to both first-party applications and third-party applications, where if the user is trying to do something specific to that application, the assistant system 140 may figure out what the user is trying to do and provide suggestions.

Figure 13:
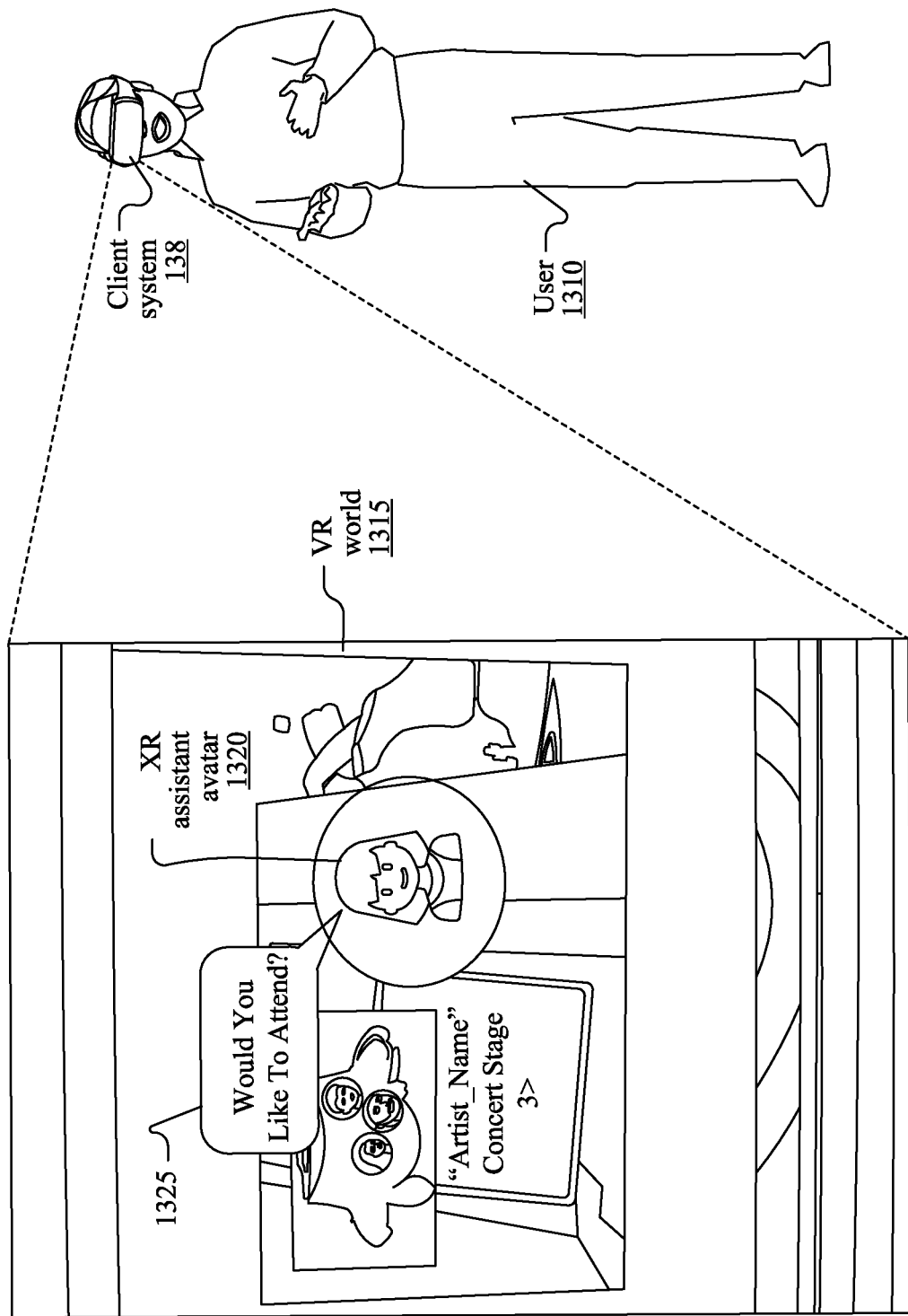
FIG. 13 illustrates an example proactive suggestion provided by the XR assistant avatar.

FIG. 13 illustrates an example proactive suggestion provided by the XR assistant avatar. The user 1310 may be wearing a VR headset as the client system 138 and exploring the VR world 1315. The assistant system 140 may find some virtual events going on. For example, there may be a concert by an artist named "Artist_Name" happening at "Stage 3." The assistant system 140 may determine that the user 1310 may be interested in this concert. Accordingly, the assistant system 140 may provide a proactive suggestion 1325 of this concert via the XR assistant avatar 1320. For example, the XR assistant avatar 1320 may ask the user 1310 "would you like to attend? 1325"

In particular embodiments, the XR assistant avatar may provide suggestions to application developers trying to integrate their applications into the metaverse, i.e., the virtual world. Since application developers plug in their applications via the assistant SDK, the assistant system 140 may know information about the third-party application and make intelligent suggestions to the application developer via the XR assistant avatar on how to set up their application in the environment. As a result, the embodiments disclosed herein may have another technical advantage of providing proactive outreach for both application developers and users as the XR assistant avatar may deliver relevant information at the right time to users and intelligent suggestions to the application developer regarding how to integrate their applications into the metaverse.

Figure 14:
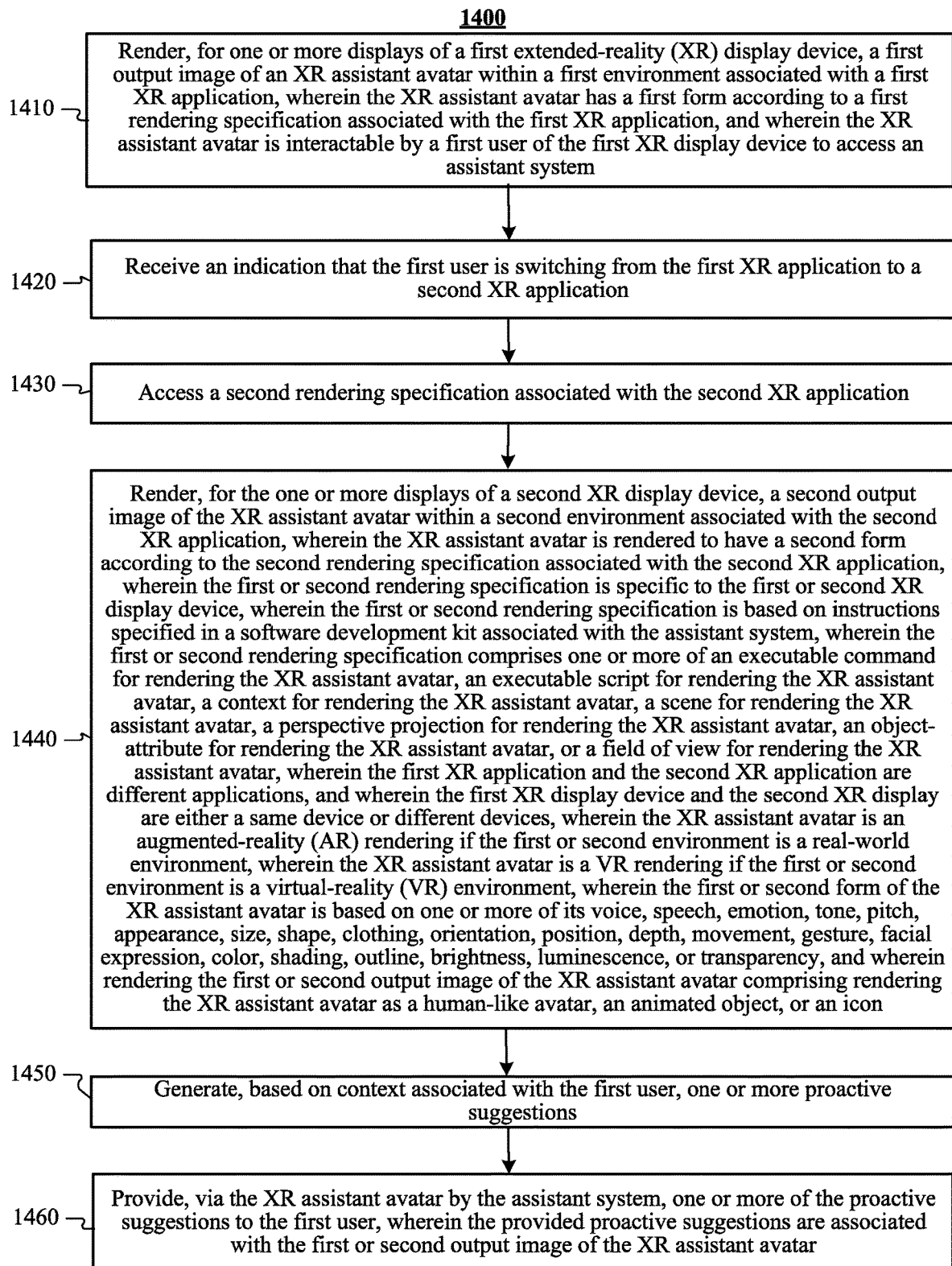
FIG. 14 illustrates an example method for integrating applications by morphing the AR/VR virtual assistant avatar.

FIG. 14 illustrates an example method 1400 for integrating applications by morphing the AR/VR virtual assistant avatar. The method may begin at step 1410, where the AR/VR system 130 may render, for one or more displays of a first extended-reality (XR) display device, a first output image of an XR assistant avatar within a first environment associated with a first XR application, wherein the XR assistant avatar has a first form according to a first rendering specification associated with the first XR application, and wherein the XR assistant avatar is interactable by a first user of the first XR display device to access an assistant system. At step 1420, the AR/VR system 130 may receive an indication that the first user is switching from the first XR application to a second XR application. At step 1430, the AR/VR system 130 may access a second rendering specification associated with the second XR application. At step 1440, the AR/VR system 130 may detect one or more user behaviors and user sentiments associated with the first user. At step 1450, the AR/VR system 130 may render, for the one or more displays of a second XR display device, a second output image of the XR assistant avatar within a second environment associated with the second XR application, wherein the XR assistant avatar is rendered to have a second form according to the second rendering specification associated with the second XR application, wherein the first or second rendering specification is specific to the first or second XR display device, wherein the first or second rendering specification is based on instructions specified in a software development kit associated with the assistant system, wherein the first or second rendering specification comprises one or more of an executable command for rendering the XR assistant avatar, an executable script for rendering the XR assistant avatar, a context for rendering the XR assistant avatar, a scene for rendering the XR assistant avatar, a perspective projection for rendering the XR assistant avatar, an object-attribute for rendering the XR assistant avatar, or a field of view for rendering the XR assistant avatar, wherein the first XR application and the second XR application are different applications, and wherein the first XR display device and the second XR display are either a same device or different devices, wherein the XR assistant avatar is an augmented-reality (AR) rendering if the first or second environment is a real-world environment, wherein the XR assistant avatar is a VR rendering if the first or second environment is a virtual-reality (VR) environment, wherein the first or second form of the XR assistant avatar is based on one or more of its voice, speech, emotion, tone, pitch, appearance, size, shape, clothing, orientation, position, depth, movement, gesture, facial expression, color, shading, outline, brightness, luminescence, or transparency, and wherein rendering the first or second output image of the XR assistant avatar comprising rendering the XR assistant avatar as a human-like avatar, an animated object, or an icon. At step 1460, the AR/VR system 130 may generate, based on context associated with the first user, one or more proactive suggestions. At step 1470, the AR/VR system 130 may provide, via the XR assistant avatar by the assistant system 140, one or more of the proactive suggestions to the first user, wherein the provided proactive suggestions are associated with the first or second output image of the XR assistant avatar. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for integrating applications by morphing the AR/VR virtual assistant avatar including the particular steps of the method of FIG. 14, this disclosure contemplates any suitable method for integrating applications by morphing the AR/VR virtual assistant avatar including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160.

Systems and Methods

Figure 15:
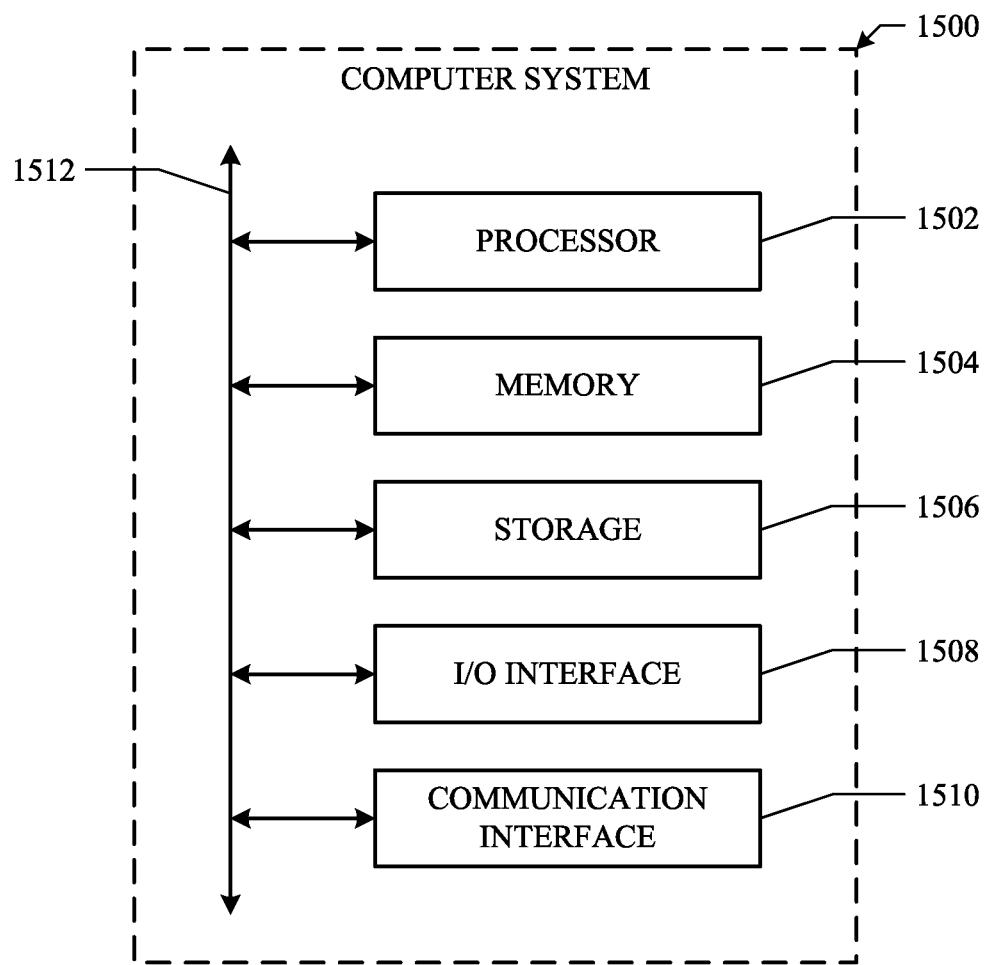
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a head-mounted extended-reality (XR) system:
    rendering, for a display of the head-mounted XR system, a first output image of an XR assistant avatar within a virtual environment in a field of view (FOV) of a user of the head-mounted XR system, wherein the XR assistant avatar follows the user to different spaces, applications, and surfaces within the virtual environment in the FOV, has a first form and a first pose, and is interactable by the user to access an assistant system, and wherein the first form and the first pose are customized to a first context of the user with respect to the virtual environment;
    detecting a change from the first context of the user with respect to the virtual environment to a second context of the user with respect to the virtual environment; and
    based on the detected change from the first context of the user with respect to the virtual environment to the second context of the user with respect to the virtual environment, rendering, for the display of the head-mounted XR system, a second output image of the XR assistant avatar, wherein the XR assistant avatar is morphed from the first form and the first pose to a second form and a second pose, wherein the second form and the second pose are customized to the second context of the user with respect to the virtual environment,
    wherein the first pose and the second pose of the XR assistant avatar each comprise at least one of a position and a movement within the virtual environment.

2. The method of claim 1, wherein the head-mounted XR system comprises an XR display device, and wherein the display is associated with the XR display device.

3. The method of claim 1, wherein the head-mounted XR system comprises the assistant system.

4. The method of claim 1, wherein the virtual environment comprises a real-world environment, and wherein the XR assistant avatar is an augmented-reality (AR) rendering of virtual objects overlaid on the real-world environment.

5. The method of claim 1, wherein the virtual environment is a virtual-reality (VR) environment, and wherein the XR assistant avatar is a VR rendering.

6. The method of claim 1, wherein the first or second form of the XR assistant avatar comprises at least one of its voice, speech, emotion, tone, pitch, appearance, size, shape, clothing, orientation, depth, gesture, facial expression, color, shading, outline, brightness, luminescence, and transparency.

7. The method of claim 1, wherein the detected change from the first context of the user with respect to the virtual environment to the second context of the user with respect to the virtual environment comprises one of a change in an application state associated with a first application on the head-mounted XR system, a change from the first application to a second application on the head-mounted XR system, and a change in the virtual environment.

8. The method of claim 7, further comprising, responsive to detecting the change from the first context of the user with respect to the virtual environment to the second context of the user with respect to the virtual environment:
    registering a first set of actions with the XR assistant avatar, wherein each action in the first set of actions corresponds to a first voice-initiated action executable via the assistant system; and unregistering a second set of actions with the XR assistant avatar, wherein each action in the second set of actions corresponds to a second voice-initiated action executable via the assistant system.

9. The method of claim 1, further comprising: determining the second form and the second pose based on a personalization model, wherein the personalization model is a machine-learning model trained on a plurality of prior reactions associated with the user with respect to a plurality of morphing of the XR assistant avatar.

10. The method of claim 1, further comprising: detecting one or more user behaviors associated with the user; and
determining, based on the one or more user behaviors, one or more user sentiments associated with the user; and
determining the second form and the second pose based on the one or more user sentiments.

11. The method of claim 1, wherein rendering the first or second output image of the XR assistant avatar comprises rendering the XR assistant avatar as a human-like avatar.

12. The method of claim 1, wherein rendering the first or second output image of the XR assistant avatar comprises rendering the XR assistant avatar as an animated object or icon.

13. The method of claim 1, further comprising: determining one or more natural-language responses for the XR assistant avatar associated with the rendering of the second output image of the XR assistant avatar, wherein the one or more natural-language responses are customized for the user.

14. The method of claim 13, wherein the one or more natural-language responses are responsive to a user request from the user.

15. The method of claim 13, wherein the one or more natural-language responses are customized further based on an application the user is currently engaged with.

16. The method of claim 1, wherein the first form and the second form are a same form.

17. The method of claim 1, wherein the first pose and the second pose are a same pose.

18. The method of claim 1, wherein rendering the first output image of the XR assistant avatar comprises morphing the XR assistant avatar in the first form and the first pose in the field of view of the user in consideration of a first activity of the user associated with the first context of the user,
wherein rendering the second output image of the XR assistant avatar comprises morphing the XR assistant avatar in the second form and the second pose in the field of view of the user in consideration of a second activity of the user associated with the second context of the user.

19. One or more computer-readable non-transitory non-volatile storage media embodying software that is operable when executed to:
render, for a display of a head-mounted extended-reality (XR) system, a first output image of an XR assistant avatar within a virtual environment in a field of view (FOV) of a user of the head-mounted XR system, wherein the XR assistant avatar follows the user to different spaces, applications, and surfaces within the virtual environment in the FOV, has a first form and a first pose, and is interactable by the user to access an assistant system, and wherein the first form and the first pose are customized to a first context of the user with respect to the virtual environment;
detect a change from the first context of the user with respect to the virtual environment to a second context of the user with respect to the virtual environment; and
based on the detected change from the first context of the user with respect to the virtual environment to the second context of the user with respect to the virtual environment, render, for the display of the head-mounted XR system, a second output image of the XR assistant avatar, wherein the XR assistant avatar is morphed from the first form and the first pose to a second form and a second pose, wherein the second form and the second pose are customized to the second context of the user with respect to the virtual environment,
wherein the first pose and the second pose of the XR assistant avatar each comprise at least one of a position and a movement within the virtual environment.

20. A system comprising: one or more processors; and a non-transitory non-volatile memory coupled to the processors comprising instructions executable by the processors, the processors operable when executing the instructions to:
render, for a display of a head-mounted extended-reality (XR) system, a first output image of an XR assistant avatar within a virtual environment in a field of view (FOV) of a user of the head-mounted XR system, wherein the XR assistant avatar follows the user to different spaces, applications, and surfaces within the virtual environment in the FOV, has a first form and a first pose, and is interactable by the user to access an assistant system, and wherein the first form and the first pose are customized to a first context of the user with respect to the virtual environment;
detect a change from the first context of the user with respect to the virtual environment to a second context of the user with respect to the virtual environment; and
based on the detected change from the first context of the user with respect to the virtual environment to the second context of the user with respect to the virtual environment, render, for the display of the head-mounted XR system, a second output image of the XR assistant avatar, wherein the XR assistant avatar is morphed from the first form and the first pose to a second form and a second pose, wherein the second form and the second pose are customized to the second context of the user with respect to the virtual environment,
wherein the first pose and the second pose of the XR assistant avatar each comprise at least one of a position and a movement within the virtual environment.

* * * * *